United States Patent
Zhai et al.

(10) Patent No.: US 9,145,615 B2
(45) Date of Patent: Sep. 29, 2015

(54) METHOD AND APPARATUS FOR THE ELECTROCHEMICAL REDUCTION OF CARBON DIOXIDE

(76) Inventors: Yumei Zhai, Dublin, OH (US); Feng Gui, legal representative, Hilliard, OH (US); Shan Guan, Dublin, OH (US); Narasi Sridhar, Dublin, OH (US); Arun S. Agarwal, Dublin, OH (US)

( * ) Notice: Subject to any disclaimer, the term of this patent is extended or adjusted under 35 U.S.C. 154(b) by 312 days.

(21) Appl. No.: 13/825,822

(22) PCT Filed: Sep. 22, 2011

(86) PCT No.: PCT/US2011/052820
§ 371 (c)(1),
(2), (4) Date: Mar. 24, 2013

(87) PCT Pub. No.: WO2012/040503
PCT Pub. Date: Mar. 29, 2012

(65) Prior Publication Data
US 2013/0186771 A1    Jul. 25, 2013

Related U.S. Application Data

(60) Provisional application No. 61/386,321, filed on Sep. 24, 2010, provisional application No. 61/414,932, filed on Nov. 18, 2010.

(51) Int. Cl.
| C25B 3/04 | (2006.01) |
| C25B 11/03 | (2006.01) |
| C25B 11/06 | (2006.01) |
| C25B 11/04 | (2006.01) |

(52) U.S. Cl.
CPC ............. *C25B 3/04* (2013.01); *C25B 11/035* (2013.01); *C25B 11/0405* (2013.01); *C25B 11/0447* (2013.01); *C25B 11/0478* (2013.01)

(58) Field of Classification Search
None
See application file for complete search history.

(56) References Cited

U.S. PATENT DOCUMENTS

| 3,925,638 A | 12/1975 | Scatoloni |
| 3,933,616 A | 1/1976 | Beer |
| 3,959,094 A | 5/1976 | Steinberg |

(Continued)

FOREIGN PATENT DOCUMENTS

WO    WO 2007/041872 A1    4/2007

OTHER PUBLICATIONS

Moussallem et al, "Chlor-alkali electrolysis with oxygen depolarized cathodes: history, present status and future prospects", Journal of Applied Electrochemistry, 2008 (no month), vol. 38, pp. 1177-1194.*

(Continued)

*Primary Examiner* — Harry D Wilkins, III
(74) *Attorney, Agent, or Firm* — The Richards Law Firm LLC; William B. Richards, Esq.

(57) ABSTRACT

A method and apparatus is provided for the electrochemical reduction of carbon dioxide to formate and formic acid. One embodiment features a three-compartment reactor which houses: a gas compartment; a catholyte compartment, which contains a porous cathode having a tin-based catalyst; and an anolyte compartment, which contains an anode having a mixed metal oxide catalyst. Further embodiments include a method for depositing tin onto a porous cathode, tin-zinc cathodes, a reaction method using an acidic anolyte, and pulsed polarization to extend reactor runtimes.

21 Claims, 20 Drawing Sheets

(56) References Cited

U.S. PATENT DOCUMENTS

| | | |
|---|---|---|
| 3,969,201 A | 7/1976 | Oloman |
| 4,118,305 A | 10/1978 | Oloman |
| 4,285,799 A | 8/1981 | de Nora |
| 4,326,930 A | 4/1982 | Nagel |
| 4,357,217 A | 11/1982 | Kuehn |
| 4,384,928 A | 5/1983 | Hall |
| 4,469,581 A | 9/1984 | Asano |
| 4,474,652 A | 10/1984 | Brown |
| 4,537,674 A | 8/1985 | Ovshinsky |
| 4,608,132 A | 8/1986 | Sammells |
| 4,609,441 A | 9/1986 | Frese, Jr. |
| 4,668,349 A | 5/1987 | Cuellar |
| 4,673,473 A | 6/1987 | Ang |
| 4,681,670 A | 7/1987 | Nobel |
| 4,798,662 A | 1/1989 | Clerc-Renaud |
| 4,882,024 A | 11/1989 | Corrigan |
| 4,882,232 A | 11/1989 | Bugnet |
| 4,897,167 A | 1/1990 | Cook |
| 4,959,131 A | 9/1990 | Cook |
| 5,051,156 A | 9/1991 | Scharifker |
| 5,066,378 A | 11/1991 | Meneghini |
| 5,156,726 A | 10/1992 | Nakada |
| 5,284,563 A | 2/1994 | Fujihira |
| 5,300,165 A | 4/1994 | Sugikawa |
| 5,312,539 A | 5/1994 | Thomson |
| 5,314,601 A | 5/1994 | Hardee |
| 5,423,967 A | 6/1995 | Kunimatsu |
| 5,482,680 A | 1/1996 | Wilkinson |
| 5,580,443 A | 12/1996 | Yoshida |
| 5,702,585 A | 12/1997 | Hillrichs |
| 5,804,045 A | 9/1998 | Orillon |
| 5,928,806 A | 7/1999 | Olah |
| 6,071,570 A | 6/2000 | Hardee |
| 6,117,286 A * | 9/2000 | Shimamune et al. ......... 204/252 |
| 6,183,545 B1 | 2/2001 | Okuhama |
| 6,217,729 B1 | 4/2001 | Zolotarsky |
| 6,312,571 B1 | 11/2001 | Nara |
| 6,472,086 B2 | 10/2002 | Lyon |
| 6,994,919 B2 | 2/2006 | Wijenberg |
| 6,998,036 B2 | 2/2006 | Dietterle |
| 7,128,823 B2 | 10/2006 | Yang |
| 7,151,049 B2 | 12/2006 | Beica |
| 7,674,549 B2 | 3/2010 | Kanai |
| 7,704,369 B2 | 4/2010 | Olah |
| 7,846,978 B2 | 12/2010 | Olah |
| 7,875,163 B2 | 1/2011 | Gilliam |
| 8,313,634 B2 | 11/2012 | Bocarsly |
| 2007/0267289 A1 | 11/2007 | Jabs |
| 2008/0023341 A1 | 1/2008 | Rossi |
| 2008/0169196 A1 * | 7/2008 | James et al. ................ 204/554 |
| 2008/0223727 A1 | 9/2008 | Oloman |
| 2008/0230380 A1 | 9/2008 | Ohsaka |
| 2009/0114532 A1 | 5/2009 | Rhodes |
| 2009/0152123 A1 | 6/2009 | Butler |
| 2009/0178931 A1 | 7/2009 | Faita |
| 2009/0200162 A1 | 8/2009 | Faita |
| 2010/0193370 A1 | 8/2010 | Olah |
| 2011/0091366 A1 | 4/2011 | Kendall |
| 2011/0091778 A1 | 4/2011 | Kambara |
| 2011/0108435 A1 | 5/2011 | Karni |
| 2011/0114502 A1 | 5/2011 | Cole |
| 2011/0114503 A1 | 5/2011 | Sivasankar |
| 2011/0114504 A1 | 5/2011 | Sivasankar |

OTHER PUBLICATIONS

Oloman et al, Electrochemical Processing of Carbon Dioxide, ChemSusChem, vol. 1, No. 5, Apr. 2008, pp. 385-391.*

Kapusta et al, The Electroreduction of Carbon Dioxide and Formic Acid on Tin and Indium Electrodes, Journal of the Electrochemical Society, vol. 130, No. 3, Mar. 1983, pp. 607-613.*

Mahmood et al, Use of gas-diffusion electrodes for high-rate electrochemical reduction of carbon dioxide. I. Reduction at lead, indium- and tin-impregnated electrodes, Jounral of Applied Electrochemistry, vol. 17, No. 6, Nov. 1987, pp. 1159-1170.*

Mahmood, Use of gas-diffusion electrodes for high-rate electrochemical reduction of carbon dioxide. L. Reduction at lead, indium- and tin-impregnated electrodes Journal of Applied Electrochemistry, 17 (1987) 1159-1170 BP Research Centre, Chertsey Road, Sunbury-on-Thames, Middlesex TW16 7LN, UK Received Jan. 29; revised May 15, 1987.

Yamamoto, Production of syngas plus oxygen from CO2 in a gas-diffusion electrode-based electrolytic cell Electrochimica Acta 47 (2002) 3327-3334 Department of Applied Chemistry, School of Engineering, The University of Tokyo, 7-3-1 Hongo, Bunkyo-ku, Tokyo 113-8656, Japan Electric Power Development Co., Ltd., 6-15-1 Ginza, Chuo-ku, Tokyo 104-8165, Japan.

Innocent, Electro-reduction of carbon dioxide to formate on lead electrode in aqueous medium J Appl Electrochem (2009) 39:227-232 Received: Mar. 18, 2008 / Accepted: Aug. 26, 2008 / Published online: Sep. 13, 2008 Springer Science+Business Media B.V. 2008.

Gastwirt, Disintegration of Lead Cathodes, II Chemistry Department, City College, New York, New York Journal of the Electrochemical Society, Dec. 1957, vol. 104, No. 12, 701-703.

Salzberg, Cathodic Disintegration of Tin Journal of the Electrochemical Society, Feb. 1958, vol. 105, No. 2, 64-66 City College, New York, New York.

Barden, Lithium livens up carbon dioxide conversion catalyst Highlights in Chemical Technology, 2008, vol. 1, RSC Publishing.

Eltron Research & Development, Selective and Rapid Alcohols/Hydrocarbons Synthesis Technology Operates Under Moderate Conditions Tech Brief, Copyright © 2009 Eltron Research & Development Inc.

Singh, A two-dimensional analysis of mass transport in proton exchange membrane fuel cells Transportation Fuelcell Systems Laboratory, Institute for Integrated Energy Systems, University of Victoria, Victoria, B.C., V8W 3P6, Canada Received Jan. 15, 1998, International Journal of Engineering Science 37 (1999) 431-452.

Sanchez-Sanchez, Electrochemical approaches to alleviation of the problem of carbon dioxide accumulation Pure Appl. Chem., vol. 73, No. 12, pp. 1917-1927, 2001.

Hudson, Electrochemical Reduction of Carbon Dioxide Department of Chemistry, State University of New York at Potsdam, Potsdam New York 13676 Submitted Dec. 9, 2005.

Cherashev, Electrochemical Reduction of Carbon Dioxide on Tin, Zinc, and Their Alloys Russian Journal of Electrochemistry, vol. 34, No. 5, 1998, p. 410-417.

Li, The electro-reduction of carbon dioxide in a continuous reactor, Journal of Appl. Electrochem., (2005) 35:955-965.

* cited by examiner

METHOD AND APPARATUS FOR THE ELECTROCHEMICAL REDUCTION OF CARBON DIOXIDE

CROSS-REFERENCES TO RELATED APPLICATIONS

This application is a national stage entry of International Application No. PCT/US2011/052820, entitled Method and Apparatus for the Electrochemical Reduction of Carbon Dioxide, filed in the RO/US on Sep. 22, 2011, which claims priority to U.S. Provisional Application No. 61/386,321, filed Sep. 24, 2010, entitled "Cathodic Catalyst, Catholyte, and Apparatus for the Electrochemical Reduction of Carbon Dioxide", and U.S. Provisional Application No. 61/414,932, filed Nov. 18, 2010, entitled "Anodic Catalyst, Anolyte, and Electrochemical Reduction of Carbon Dioxide", which applications are incorporated herein by reference.

TECHNICAL FIELD

This description relates to electrochemical methods and apparatus, particularly to the electrochemical reduction of carbon dioxide, and more particularly to the electrochemical reduction of carbon dioxide to formate and formic acid.

BACKGROUND

The buildup of carbon dioxide ($CO_2$) in the earth's atmosphere is currently causing concern among many scientists and others interested in potentially adverse global climate change, and the primary source of this additional $CO_2$ is the result of the combustion of carbon-containing materials, such as fossil fuels. It is desirable, therefore, to find and develop improved methods of reducing the discharge of $CO_2$ into the atmosphere. One method involves sequestering, or storing, the $CO_2$ to keep it out of the atmosphere. There are many natural, biological processes which effect sequestering, as well as artificial process such as those involving capture and underground storage of $CO_2$ and chemical techniques such as conversion to carbonate mineral forms. In addition, however, $CO_2$ may be electrochemically converted into useful and marketable commodities, including, for example, methane, ethylene, cyclic carbonates, methanol, and formic acid or formate. One $CO_2$ conversion process involves the electrochemical reduction of $CO_2$ (ECRC) to formic acid. Formic acid, for example, finds uses in replacing HCl in steel pickling, traditional tanning of leather, formic acid-based fuel cells, as a storage medium for hydrogen ($H_2$) and carbon monoxide (CO) that are then used as fuels and chemical feedstocks, conversion to sodium formate for airport runway deicing, preservatives and antibacterial agents, as an ingredient in bleaching pulp and paper, and as a precursor for organic synthesis, including pharmaceuticals. ECRC to formate and formic acid, however, exhibits the lowest energy requirements.

The electrochemical $CO_2$ conversion process, however, could benefit from reduced energy requirements and improved catalysts, $CO_2$ fixation, and reactor design as well as better-integrated, more efficient process configurations.

ECRC involves a highly interrelated process. The entire process is based upon the balanced flow of electrons, ions in solution, and gas, as well as current density, and voltage, across the entire electrochemical reactor as well as across the individual reactor elements. $CO_2$ is reduced to end products at a cathode to which electrons are supplied via an external electrical connection by the oxidation of water or other compounds at an anode. The anode and cathode are separated by a selective-ion membrane which allows certain ions to migrate from the anode to the cathode, thus completing the electrical circuit. Thus, changes in one part of the cell can affect other parts. Changes to the anode, for example, can effect changes in $V_{CELL}$ (voltage across the entire reactor), current density, and the efficiency of conversion of $CO_2$ to products. Likewise, different cations and different anions, present in the catholyte and the anolyte, can have different effects on catalytic behavior. For example, when an acid is added to the anolyte, the hydrogen ions (protons, $H^+$) from the anode migrate through the selective ion membrane to the catholyte, effecting the formation of formic acid at the cathode. If, on the other hand, sodium hydroxide (NaOH) is added to the anolyte, the sodium ions move across, forming sodium formate (HCOONa) as the end product. In addition, reactor configuration can impact various other elements of the process, such as electrical resistance, which can impact energy requirements. Runtime life of the entire process can also be an important consideration as shorter runtimes can require more frequent regeneration of catalysts and repair of reactor components. Finally, it is very important, and a measure of the performance of the overall process, to maintain a high Faradaic Efficiency (FE) (expressed as a percentage or as a fraction) throughout the process and over time. As used herein, FE indicates the fraction (or percent) of the total current that passes the electrochemical cell that is used to produce the desired product (e.g., formate). The higher the FE, the better, and the maximum FE is 1.0.

Thus, there is a need for an electrochemical process that offers improved overall engineering and overall performance.

SUMMARY

Various embodiments of the present invention include a tin-based (Sn-based) cathode and methods of preparation of such cathode, tin-zinc (Sn—Zn) alloy-based cathodes, high surface area cathode fabrication, improved catholyte compositions, mixed metal oxide-catalyzed anodes in acidic anolytes, pulsed polarization of the anode and the cathode, and various configurations of three-compartment reactors, each of which provides improved performance of ECRC, particularly ECRC to formate and formic acid.

In one embodiment, a process includes, in part, introducing $CO_2$ gas into a catholyte compartment of an electrochemical reactor where the catholyte compartment at least partially contains a cathode comprising a catalyst comprising a Sn—Zn alloy, the Zn comprising between about three weight percent and about six weight percent of the catalyst. In a further embodiment, an apparatus includes, in part, a cathode comprising a Sn—Zn alloy as just described and the catholyte compartment includes a mixture comprising a catholyte, gaseous carbon dioxide, and formate and formic acid.

In a further embodiment, a solution formulated to deposit Sn onto a porous, electrically conductive substrate includes a Sn salt, at least one complexing agent, optionally, an antioxidant, and a non-ionic surfactant. In a further embodiment, a process includes immersing a porous, electrically conductive substrate into the solution just described, maintaining a temperature of the solution, and effecting a current density on the substrate.

In a further embodiment, a manufacture includes a porous, electrically conductive substrate with a Sn catalyst deposited thereon. The Sn catalyst comprises Sn deposits having a grain size of between about 0.5 microns and about five microns, the deposits substantially covering an outer surface of the substrate. In a further embodiment, a manufacture is formed by process for depositing Sn onto a substrate using a solution comprising a Sn salt, at least one complexing agent, optionally, an anti-oxidant, and a non-ionic surfactant. In a further embodiment, a manufacture comprises a substrate comprising metallic foam, metallic felt, carbon fiber paper, or reticulated vitreous carbon.

In a further embodiment, a process includes introducing an anolyte into an anolyte compartment that contains an anode which comprises a substrate and a mixed metal oxide catalyst and also introducing $CO_2$ gas from a gas compartment into a catholyte compartment, where the catholyte compartment contains a catholyte and a cathode. Further, impressing a DC voltage across the anode and the cathode converts at least a portion of the $CO_2$. In a further embodiment, the anolyte is acidic and the $CO_2$ is converted to formic acid. In a further embodiment the anolyte is alkaline and at least a portion of the $CO_2$ is converted to formate. In a further embodiment, the anode comprises a substrate comprising titanium (Ti), and the metal oxide comprises tantalum oxide ($Ta_2O_5$) deposited onto the substrate, and iridium oxide ($IrO_2$) deposited onto the tantalum oxide. In a further embodiment, the cathode comprises a porous, electrically conductive substrate and a Sn-based catalyst. In a further embodiment, an apparatus includes a container, a membrane positioned within the container dividing the container into a catholyte compartment containing a cathode, and an anolyte compartment containing an anode, the anode comprising a substrate and a mixed metal oxide catalyst deposited upon the substrate. A mixture comprising a catholyte and $CO_2$ gas is at least partially contained within the catholyte compartment. A voltage source is provided configured to impress a DC voltage across the anode and the cathode.

In a further embodiment, a process configured for ECRC to formate includes introducing into an anolyte compartment an anolyte, introducing into a catholyte compartment a catholyte comprising an aqueous solution of about 0.1M to about 2M of a compound selected from the following: potassium sulfate ($K_2SO_4$) having a pH of about 6.5 and sodium sulfate ($Na_2SO_4$) having a pH of 5.5. $CO_2$ is also introduced into the catholyte compartment. A DC voltage is impressed across the anode and the cathode, whereby at least a portion of the $CO_2$ is converted to formate.

In a further embodiment, a process includes introducing an anolyte into an anolyte compartment of an electrochemical reactor, where the anolyte compartment at least partially contains an anode; introducing $CO_2$ gas from a gas compartment into a catholyte compartment of the electrochemical reactor, the gas compartment in fluid communication with the catholyte compartment, the catholyte compartment separated from the anolyte compartment by a membrane, the catholyte compartment further containing a cathode, the cathode comprising a substrate and a cathodic catalyst which contains Sn or a Sn—Zn alloy; introducing a catholyte into the catholyte compartment; impressing a DC voltage across the anode and the cathode, whereby at least a portion of the $CO_2$ is converted; and removing a deposit from the cathode by periodically applying anodic polarization, deep cathodic polarization, and a combination thereof. In a further embodiment, the periodic deep polarization is superimposed on top of the DC voltage and the total application is between about 0.3 percent and about 1.7 percent of a maximum time interval between applications of less than 24 hours. In a further embodiment, the current density of the anodic polarization is a positive current density about ten times the current density effected by the impressed DC voltage across the anode and the cathode. In a further embodiment, the current density of the deep cathodic polarization is a negative current density about ten times the current density effected by the impressed DC voltage across the anode and the cathode. In a further embodiment, the anodic polarization and the deep cathode polarization are applied sequentially.

In a further embodiment, a process includes introducing an anolyte into an anolyte compartment of an electrochemical reactor, which anolyte compartment at least partially contains an anode; introducing a catholyte into a catholyte compartment of the electrochemical reactor, the catholyte separated from the anolyte compartment by a membrane, the catholyte compartment further separated from a gas compartment by a porous cathode, the cathode and the membrane at least partially defining the catholyte compartment, the cathode comprising a Sn-based catalyst as described herein above; introducing $CO_2$ gas into the gas compartment; introducing the $CO_2$ gas from the cathode into the catholyte; and impressing a DC voltage across the anode and the cathode, whereby at least a portion of the $CO_2$ is converted. In a further embodiment, a porous, absorbent, nonconductive pad, such as felt or foam, is adjacent to a membrane side of the cathode. In a further embodiment, the process further includes introducing at least a portion of the catholyte into the porous, absorbent, nonconductive pad. In a further embodiment, the process includes introducing the $CO_2$ gas from the gas compartment into a diffuser prior to introducing the $CO_2$ gas into the cathode, the diffuser adjacent to the cathode.

In a further embodiment, a process includes introducing an anolyte into an anolyte compartment of an electrochemical reactor, the anolyte compartment at least partially containing an anode; introducing a catholyte into a catholyte compartment of the electrochemical reactor, the catholyte compartment separated from the anolyte compartment by a membrane, the catholyte compartment further separated from a gas compartment by a porous, catalytically coated cathode, the cathode and the membrane at least partially defining the cathode compartment; introducing $CO_2$ gas into the gas compartment; introducing the $CO_2$ gas from the gas compartment into the cathode; introducing the $CO_2$ gas from the cathode into the catholyte; and impressing a DC voltage across the anode and the cathode, whereby at least a portion of the carbon dioxide is converted to formate. In a further embodiment, the catholyte compartment contains a porous, absorbent, nonconductive pad, such as felt or foam, the porous, absorbent, nonconductive pad adjacent to a membrane side of the cathode. In a further embodiment, the process further includes introducing at least a portion of the catholyte into the porous, absorbent, nonconductive pad. In a further embodiment, the process further includes introducing the $CO_2$ gas from the gas compartment into a diffuser prior to introducing the $CO_2$ gas into the cathode.

In a further embodiment, a process includes introducing an anolyte into an anolyte compartment of an electrochemical reactor, the anolyte compartment at least partially containing an anode; introducing a catholyte into a porous, catalytically coated cathode, the cathode contained within a catholyte compartment, the catholyte compartment separated from the anolyte compartment by a membrane, the cathode adjacent to the membrane; introducing $CO_2$ gas from a gas compartment into the cathode; and impressing a DC voltage across the anode and the cathode, whereby at least a portion of the $CO_2$ is converted to formate. In a further embodiment, the process includes introducing the $CO_2$ gas from the gas compartment into a diffuser prior to introducing the $CO_2$ gas into the cathode, the diffuser adjacent to the cathode.

In a further embodiment, an apparatus includes a container; a membrane, the membrane positioned within the container, the membrane dividing the container into a catholyte compartment and an anolyte compartment; an anode, the anode positioned at least partially within the anolyte compartment; a porous cathode, the cathode separating the catholyte compartment from a gas compartment, the cathode comprising a Sn-based catalyst; a catholyte, the catholyte at least partially contained within the catholyte compartment, the catholyte in fluid communication with the cathode, the cathode configured to enable the introduction of $CO_2$ gas from the gas compartment into the cathode, and then into the catholyte; a voltage source, the voltage source in electrical communication with the anode and with the cathode, the voltage source configured to impress a DC voltage across the anode and the cathode. In a further embodiment, the apparatus further comprises a porous, absorbent, nonconductive pad, such as felt or foam, the porous, absorbent, nonconductive pad positioned within the catholyte compartment, the porous, absorbent, nonconductive pad further positioned adjacent to a membrane side of the catalyst. In a further embodiment, the apparatus further comprises a catholyte feed in fluid communication with the porous, absorbent, nonconductive pad, the porous, absorbent, nonconductive pad containing at least a portion of the catholyte. In a further embodiment, the apparatus further includes a diffuser, the diffuser positioned between the gas compartment and the cathode, the diffuser adjacent to the cathode; the diffuser in fluid communication with the gas compartment, and the diffuser in fluid communication with the cathode; the gas compartment, the diffuser, and the cathode configured to enable $CO_2$ gas to flow from the gas compartment, through the diffuser, then through the cathode, and then into the catholyte.

In a further embodiment, an apparatus includes a container; a membrane, the membrane positioned within the container, the membrane dividing the container into a catholyte compartment and an anolyte compartment; an anode, the anode positioned at least partially within the anolyte compartment; a porous, catalytically coated cathode, the cathode at least partially contained within the catholyte compartment; a gas compartment, the gas compartment in fluid communication with the cathode; a voltage source, the voltage source in electrical communication with the anode and with the cathode, the voltage source configured to impress a DC voltage across the anode and the cathode. In a further embodiment, the apparatus further includes a porous, absorbent, nonconductive pad, such as felt or foam, the porous, absorbent, nonconductive pad at least partially contained within the catholyte compartment, the porous, absorbent, nonconductive pad adjacent to a membrane side of the cathode. In a further embodiment, the apparatus further includes a catholyte feed in fluid communication with the porous, absorbent, nonconductive pad, the porous, absorbent, nonconductive pad containing at least a portion of catholyte. In a further embodiment, the apparatus further includes a diffuser, the diffuser positioned between the gas compartment and the cathode, the diffuser adjacent to the cathode; the diffuser in fluid communication with the gas compartment, and the diffuser in fluid communication with the cathode; the gas compartment, the diffuser, and the cathode configured to enable $CO_2$ gas to flow from the gas compartment, through the diffuser, then through the cathode, and then into the catholyte.

In a further embodiment, an apparatus includes a container; a membrane, the membrane positioned within the container, the membrane dividing the container into a catholyte compartment and an anolyte compartment; an anode, the anode positioned at least partially within the anolyte compartment; a porous, catalytically coated cathode, the cathode contained within the catholyte compartment; a catholyte feed, the catholyte feed in fluid communication with the cathode, the cathode containing at least a portion of the catholyte; a gas compartment, the gas compartment in fluid communication with the cathode; and a voltage source, the voltage source in electrical communication with the anode and with the cathode, the voltage source configured to impress a DC voltage across the anode and the cathode. In a further embodiment, the apparatus further includes a diffuser, the diffuser positioned between the gas compartment and the cathode, the diffuser adjacent to the cathode; the diffuser in fluid communication with the gas compartment, and the diffuser in fluid communication with the cathode; the gas compartment, the diffuser, and the cathode configured to enable $CO_2$ gas to flow from the gas compartment, through the diffuser, then into the cathode, and then into the catholyte. In a further embodiment, the apparatus further includes comprising a porous, absorbent, nonconductive pad, the porous, absorbent, nonconductive pad at least partially contained within the catholyte compartment, the porous, absorbent, nonconductive pad adjacent to a membrane side of the cathode.

In a further embodiment, a process includes introducing an acidic anolyte into an anolyte compartment of an electrochemical reactor, the anolyte compartment containing an anode which anode comprises a Ti substrate, $Ta_2O_5$ deposited onto the substrate, and $IRO_2$ deposited onto the $Ta_2O_5$. A further step includes introducing a catholyte into a catholyte compartment of the reactor where the catholyte compartment is separated from the anolyte compartment by a membrane. The catholyte compartment contains a porous, absorbent, nonconductive pad, such as felt or foam, adjacent to a catholyte compartment side of the membrane. The catholyte compartment also contains a cathode which separates the cathode compartment from a gas compartment. The cathode comprises a carbon fiber substrate and a Sn catalyst deposited onto the substrate. The Sn deposits have a grain size of between about 0.5 microns and about 5 microns, and substantially cover the outer surface of the substrate. A further step includes introducing $CO_2$ gas from the gas compartment into a diffuser which is adjacent to a gas compartment side of the cathode; the gas compartment in fluid communication with the cathode and in fluid communication with the catholyte. A further step includes introducing the $CO_2$ gas from the diffuser into the cathode, introducing the $CO_2$ from the cathode to the catholyte, and impressing a DC voltage across the anode and the cathode, whereby at least a portion of the $CO_2$ is converted to formic acid.

In a further embodiment, an apparatus includes a container; a membrane positioned within the container and dividing the container into an anolyte compartment and a catholyte compartment. In addition, an acidic anolyte is at least partially contained within the anolyte compartment as is an anode. The anode comprises a Ti substrate, $Ta_2O_5$ deposited onto the substrate and $IRO_2$ deposited onto the $Ta_2O_5$. A cathode comprising a carbon fiber paper substrate and a Sn catalyst deposited onto the substrate is positioned within the catholyte compartment. The Sn catalyst comprises Sn deposits having a grain size of between about 0.5 microns and about 5 microns which substantially cover the outer surface of the substrate. The cathode separates the cathode compartment from a gas compartment. A porous, absorbent, nonconductive pad is adjacent to a catholyte compartment side of the membrane and a diffuser is adjacent to a gas compartment side of the cathode. A mixture comprising a catholyte, CO2 gas, and formic acid is at least partially contained within the catholyte compartment. A voltage source, in electrical communication with the anode and with the cathode, is configured to impress a DC voltage across the anode and the cathode.

Additional objects, features, and advantages of the invention will become apparent to those skilled in the relevant art upon consideration of the following detailed description of preferred embodiments, the drawings, and the claims.

BRIEF DESCRIPTION OF THE SEVERAL VIEWS OF THE DRAWING

The invention will be more readily understood by reference to the accompanying drawings, wherein like reference numerals indicate like elements. The drawings are incorporated in, and constitute a part of, this specification, illustrate several embodiments consistent with the invention and, together with the description serve to explain the principles of the invention. For purposes of illustration, drawings may not be to scale.

DETAILED DESCRIPTION

Figure 1:
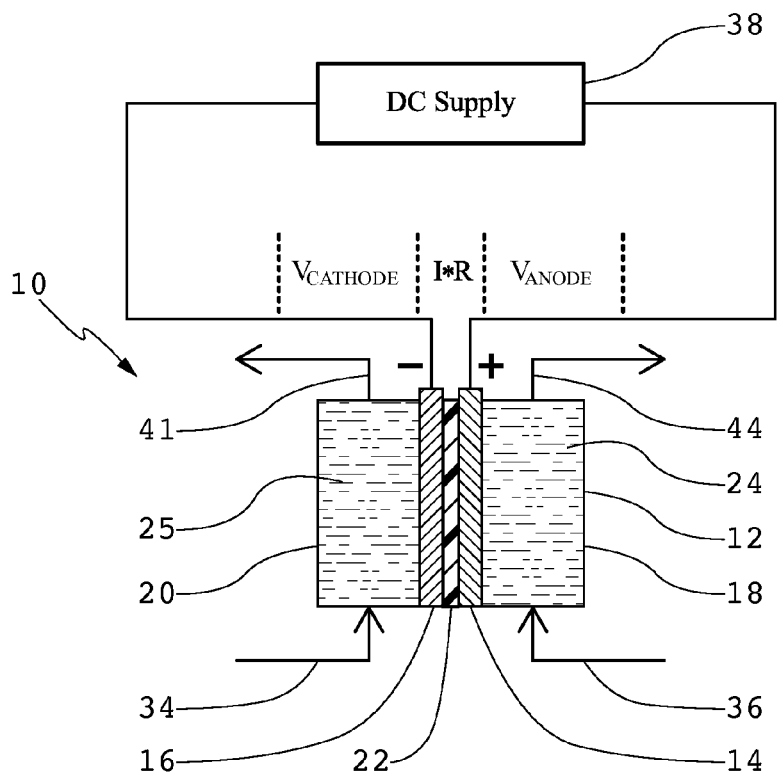
FIG. 1 is a schematic of an overall view of an electrochemical reactor.

Looking first at FIG. 1, a general schematic of an electrochemical reactor, generally 10 illustrates the interrelated nature of the process. Within the container 12 are an anolyte compartment 18 and a catholyte compartment 20 which are separated by a membrane 22 (e.g., a cation exchange membrane, such as Nafion® 117, duPont, Wilmington, Del.). Included within the anolyte compartment 18 is an anolyte 24, formulated for the desired reaction(s), and an anode 14. Included within the catholyte compartment 20 is a catholyte 25, also formulated for the desired reaction(s), and a cathode 16. Note that while the anode 14 and the cathode 16 are shown adjacent the membrane 22, this need not be the configuration. Completing the reactor is a DC voltage source 38 in electrical communication with the anode 14 and with the cathode 16. In continuous operation, the electrochemical reactor of FIG. 1 also includes an anolyte feed 36, an anolyte withdrawal 44, which may contain spent anolyte as well as reaction product(s), a catholyte feed 34, and a catholyte withdrawal, which may likewise contain spent catholyte as well as reaction product(s).

Also illustrated in FIG. 1 are the various voltage drops and resistances according to the formula:

$$V_{CELL} = V_{CATHODE} + I*R + V_{ANODE},$$

where I=current, R=internal and external resistance, and their product (I*R) refers to the voltage loss in the cell. Thus, changes to any of the components in the reactor configuration can potentially change the operation of the entire reactor. For example, by employing an improved anodic catalyst, $V_{ANODE}$ may be decreased, which decreases $V_{CELL}$, thus reducing the energy consumption of the whole process, since total energy consumption, E, can be defined as:

$$E = V_{CELL}*I*T,$$

where I is based upon the amount of feed (e.g., $CO_2$) to be converted to products (e.g., formate/formic acid), and T is the time of operation (e.g., one year). An improved anodic catalyst that also maintains or enhances current density ($mA/cm^2$) can provide additional benefits.

In the ECRC to formate context, the anolyte withdrawal 44 contains anolyte plus oxygen ($O_2$), the catholyte feed 34, in addition to containing catholyte contains $CO_2$, and withdrawn from the catholyte compartment 20, a catholyte mixture withdrawal 43 contains catholyte, formate or formic acid, $H_2$, CO, and unreacted $CO_2$. The reactions at the cathode 25 include:

$$2CO_2(aq)+4H^++4e^- \rightarrow 2HCOOH(aq);$$

$$2CO_2(aq)+4H^++4e^- \rightarrow 2CO(g)+2H_2O; \text{ and}$$

$$4H^++4e^- \rightarrow 2H_2(g)$$

The reactions at the anode 14 includes:

$$2H_2O \rightarrow O_2+4H^++4e^-; \text{ and}$$

$$OH^- \rightarrow O_2+2H_2O+4e^-.$$

In one embodiment, a Sn—Zn alloy is employed as a cathodic catalyst for ECRC to formate where the Zn comprises between about three weight percent and about six weight percent of the cathodic catalyst. In a further embodiment, the Zn comprises about three weight percent and in a further embodiment, the Zn comprises about six weight percent of the cathodic catalyst.

Sn—Zn Alloy Cathodic Catalyst Tests

Figure 3:
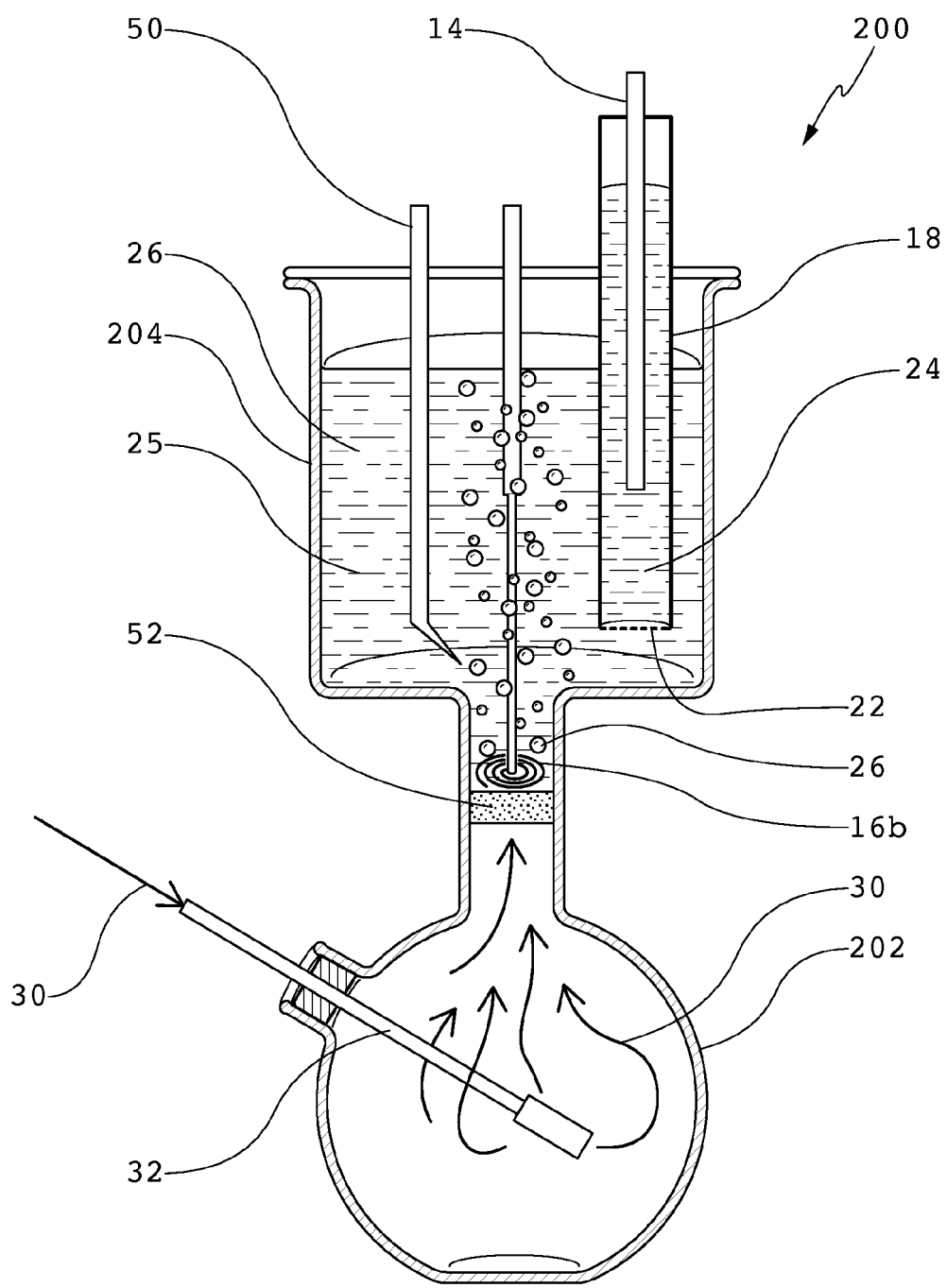
FIG. 3 is a schematic of a vertical electrochemical half-cell testing apparatus.

FIG. 3 is a schematic of a vertical electrochemical half-cell testing apparatus 200 used to test Sn—Zn alloys for cathodic catalysts. $CO_2$ gas 30 was passed into a flask 202 via a $CO_2$ gas feed 32. The $CO_2$ gas 30 then rises and passes through a glass frit 52 and into the catholyte 25 contained in a container 204 which container 204 also acts as a catholyte compartment 20. The Sn—Zn alloys of interest were positioned closely to the catholyte side of the glass filter 52 is a coil cathode 16b, or working electrode, all in the shape of a coil, as shown. Thus, the $CO_2$ 30 bubbled by and through the test alloy creating a three-phase condition, also containing formate/formic acid, or catholyte compartment mixture 26 at the coil cathode 16b. The remainder of the apparatus included a reference electrode, saturated calomel electrode (SCE) 50, an anolyte compartment 18 containing anolyte 24 and a counter electrode acting as an anode 14. A Nafion® membrane 22 separated the catholyte compartment 20 from the anolyte compartment 18. A potentiostat (not shown) was used as a voltage source.

Figure 4:
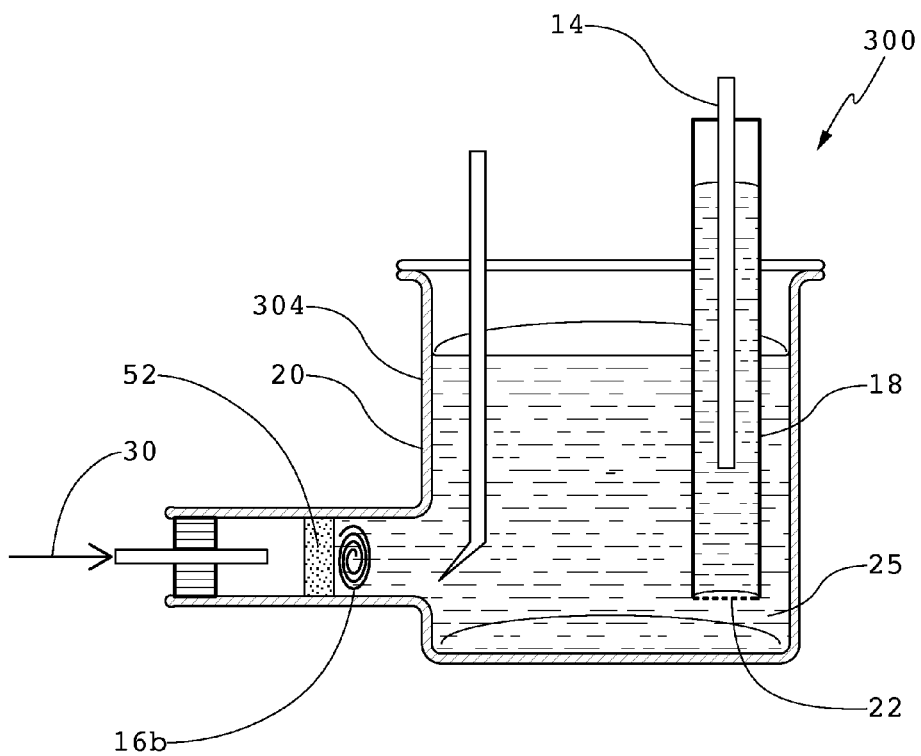
FIG. 4 is a schematic of a horizontal electrochemical half-cell testing apparatus.

FIG. 4 is a schematic of an analogous, but horizontal, electrochemical half-cell testing apparatus 300 with a half-cell horizontal container 304 used to test Sn—Zn alloys for cathodic catalysts. Similar elements with the vertical apparatus 200 are referenced similarly in the horizontal apparatus 300.

The alloys were acquired from Sophisticated Alloys, Inc, Butler, Pa. and were fabricated from pure (99.99 percent) element metals. Potentiostatic polarization at each potential was applied for two hours and formate concentrations analyzed with a Dionex® ion chromatograph (Dionex Corp., Sunnyvale, Calif.). Pure $CO_2$ gas 30 was continuously purged through a coil-form cathode 16b at 75 ml/min. The coils themselves were 40 cm long and 1 mm in diameter. The catholyte 25 was 400 ml 2M KCl and the anode 14 was Pt wire immersed in 1 M NaOH anolyte 24.

Figure 5:
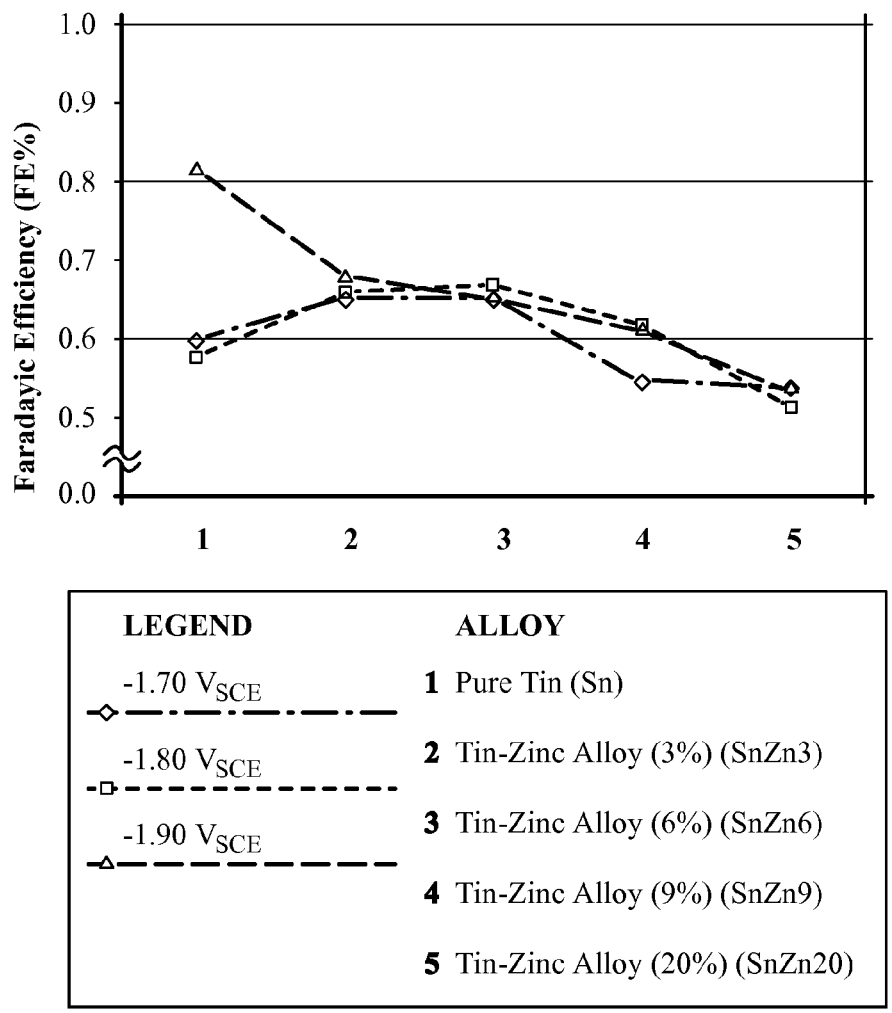
FIG. 5 is a graph of Faradaic Efficiency (FE) fraction versus cathode potential for several Sn-based cathodic catalysts.

FIG. 5 shows the results of evaluating FE for several Sn—Zn alloy cathodic catalyst as well a pure Sn at values of $-1.7 V_{SCE}$, $-1.8 V_{SCE}$, and $-1.9 V_{SCE}$. The apparatus used for these tests was the vertical electrochemical half-cell 200 illustrated in FIG. 3 and described above. The $V_{SCE}$ range was chosen to give the best FE, or selectivity of $CO_2$ to formate salts. Values below and above that range tend to decrease FE significantly. As shown in FIG. 5, SnZn3 (Sn with three percent Zn), SnZn6 (Sn with six percent Zn), SnZn9 (Sn with nine percent Zn), and SnZn20 (Sn with 20 percent Zn) are all well behaved at the $V_{SCE}$ values of interest. That is, FE for each alloy changes little between $-1.7 V_{SCE}$ and $-1.9 V_{SCE}$, thus allowing for more robust reactor operation over a broader $V_{SCE}$ range. In addition, SnZn3 and SnZn6 exhibit better FE than either SnZn9 or SnZn20, and SnZn9 shows better FE than SnZn20. SnZn3 and SnZn6 also exhibit better FE than pure Sn for $-1.7 V_{SCE}$ and $-1.8 V_{SCE}$. There is, therefore, an unexpected benefit to operating at lower Zn levels and FE does not improve with increasing Zn content. In large reactors, with electrodes in the range of 1 $m^2$, there exists a potential variation on the surface, but if the FE remains constant, the overall reactor FE will remain constant with the resultant more uniform product selectivity.

Figure 6:
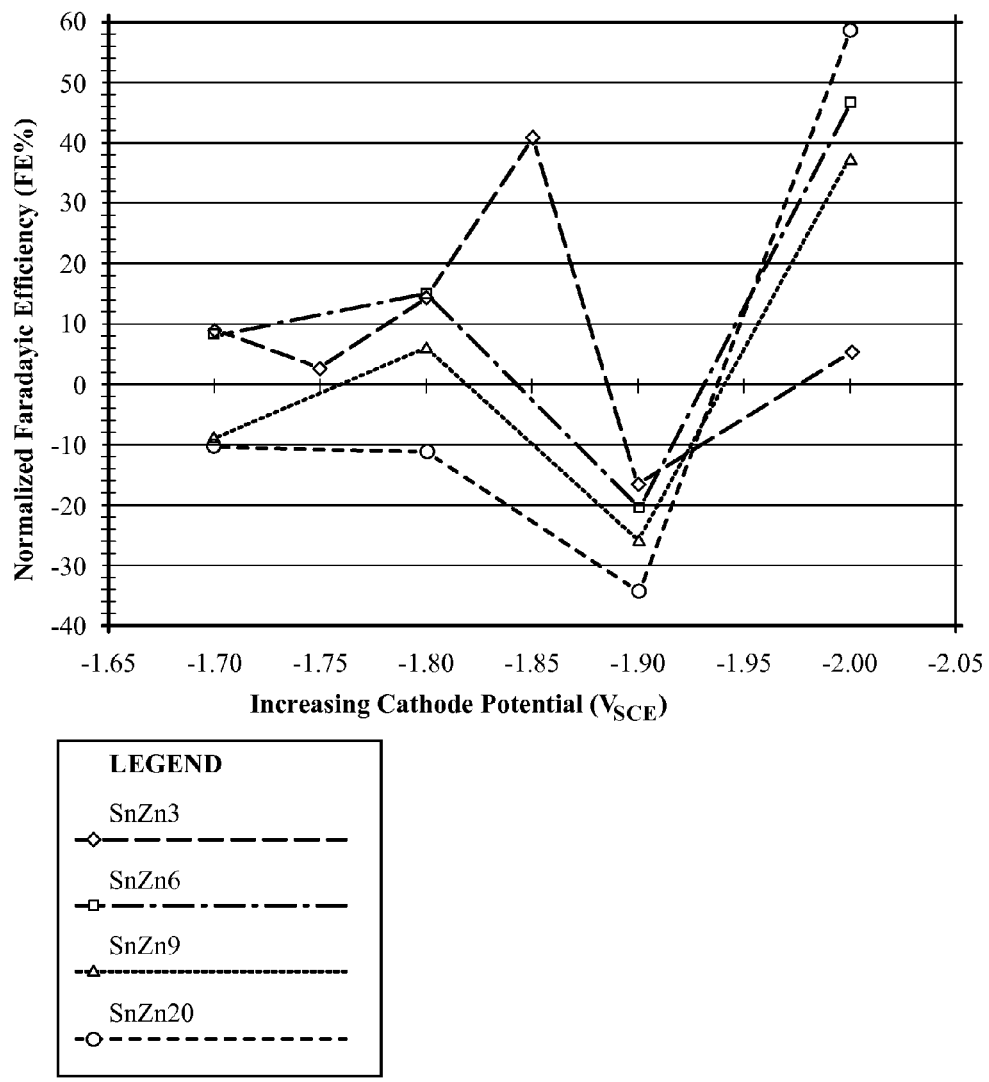
FIG. 6 is a graph of Faradaic Efficiency Percent (FE %) normalized to pure Sn versus cathode potential for several Sn-based cathodic catalysts.

In FIG. 6, the FE values for the various Sn-based cathodic catalysts have been normalized versus pure Sn:

$$\% \text{ Normalized FE} = \frac{(FE_{Sn\text{-}Zn\ Alloy} - FE_{Pure\ Sn})}{FE_{Pure\ Sn}} * 100$$

Thus, normalized values of SnZn3 and SnZn6, although lower at $-1.9 V_{SCE}$, are higher than that of pure Sn at all other potential values.

In further embodiments, the Sn—Zn alloys as cathodic catalysts are combined with a catholyte formulated for ECRC to formate, which catholyte comprises 2M KCl. In a further embodiment, the Sn—Zn alloys as cathodic catalysts are combined with anolytes formulated for ECRC to formate, which anolytes comprise 1M sodium hydroxide (NaOH) or 0.5M sulfuric acid ($H_2SO_4$).

Figure 2:
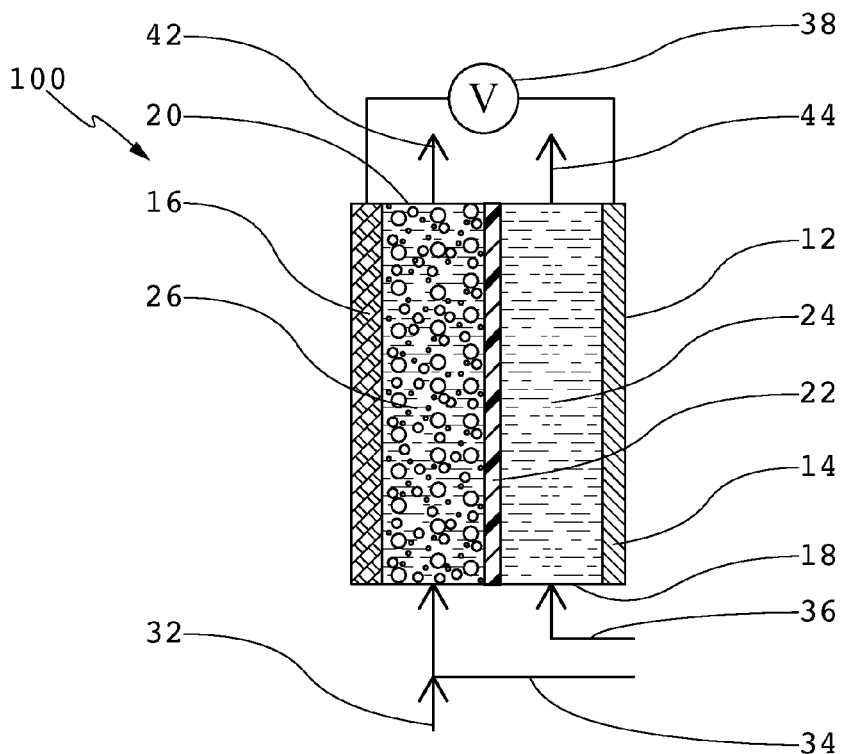
FIG. 2 is a schematic of a two-compartment electrochemical reactor illustrating a catholyte mix of catholyte and gas.
Figure 7:
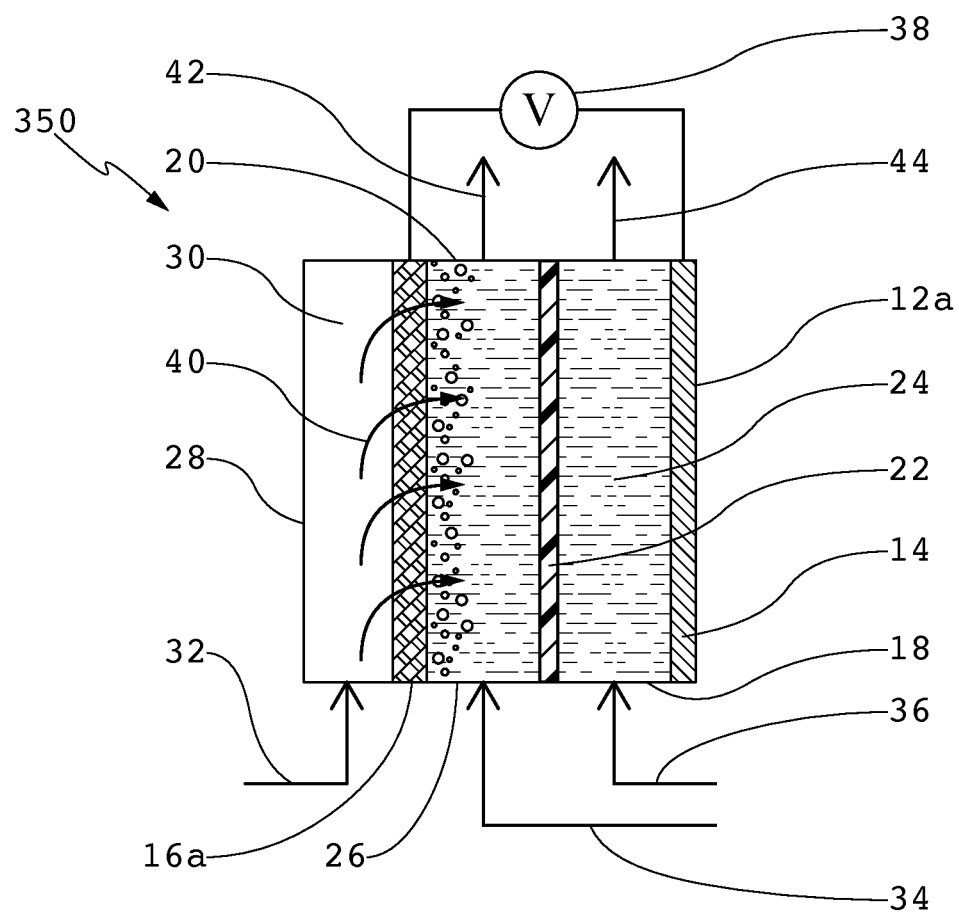
FIG. 7 is a schematic of a three-compartment electrochemical reactor illustrating $CO_2$ gas feed through a porous cathode into the catholyte.

In a further embodiment, the Sn—Zn alloy cathodic catalysts are employed in a two-compartment electrochemical reactor, as shown in FIG. 2, and three-compartment electrochemical reactors, as shown in FIG. 7, and variations thereof as described herein below.

Turning to FIG. 2, a two-compartment electrochemical reactor 100 is shown in which a container 12 encloses an anolyte compartment 18, an anode 14, during operation, anolyte 24, a membrane 22, a catholyte compartment 20, a cathode 16, and, during operation, a catholyte compartment mixture 26. During operation, a two-phase catholyte/$CO_2$ feed (from catholyte feed 34 and CO2 gas feed 32) is introduced into the catholyte compartment 20. The catholyte compartment 20 contains the cathode 16, the anolyte compartment 18 contains the anode 14, and the catholyte compartment 20 and the anolyte compartment 18 are separated by the membrane 22. Either the anode 14, the cathode 16, or both may also include a catalyst formulated for ECRC to formate. An anolyte feed 36, the catholyte feed 34, which joins with the with the $CO_2$ feed 32 into the catholyte compartment 20, an anolyte withdrawal 44, which withdraws anolyte 24 as well as other anode reaction products, and a catholyte mixture withdrawal 42 are further included. Contained within the catholyte compartment 20, during operation, is the catholyte compartment mixture 26, which mixture comprises catholyte, $CO_2$, and ECRC products such as formate and formic acid.

Turning now to FIG. 7, a three-compartment electrochemical reactor 350 is shown in which a three-compartment container 12a encloses an anolyte compartment 18, an anode 14, and, during operation, anolyte 24 contained within the anolyte compartment 18; a membrane 22; a catholyte compartment 20, a porous cathode 16a, and, during operation, catholyte compartment mixture 26 contained within the catholyte compartment 20; and a gas compartment 28, the gas compartment 28 containing, during operation, $CO_2$ gas 30. The membrane 22 separates the anolyte compartment 18 and the catholyte compartment 20 and a porous cathode 16a separates the catholyte compartment from the gas compartment 28. Also during operation, an anolyte feed 36 introduces anolyte 24 into the anolyte compartment 18, an anolyte withdrawal 44 removes anolyte 24 as well as other anode reaction products, a catholyte feed 34 introduces catholyte 25 into the catholyte compartment 20, a catholyte compartment mixture withdrawal 42 removes catholyte compartment mixture 26, and a $CO_2$ gas feed 32 introduces $CO_2$ gas 30 into the gas compartment 28. During operation, the $CO_2$ gas 30 in the gas compartment 28, under a pressure differential across the porous cathode 16a, is distributed (indicated by arrows 40 and flows through the porous cathode 16a and into the atholyte mixture 26. The porous cathode 16a may comprise a suitable cathodic catalyst, for example, one based upon Sn or a Sn-based alloy as described herein. The porous cathode 16a may further comprise substrates and cathodic catalysts deposited as described herein.

Figure 8:
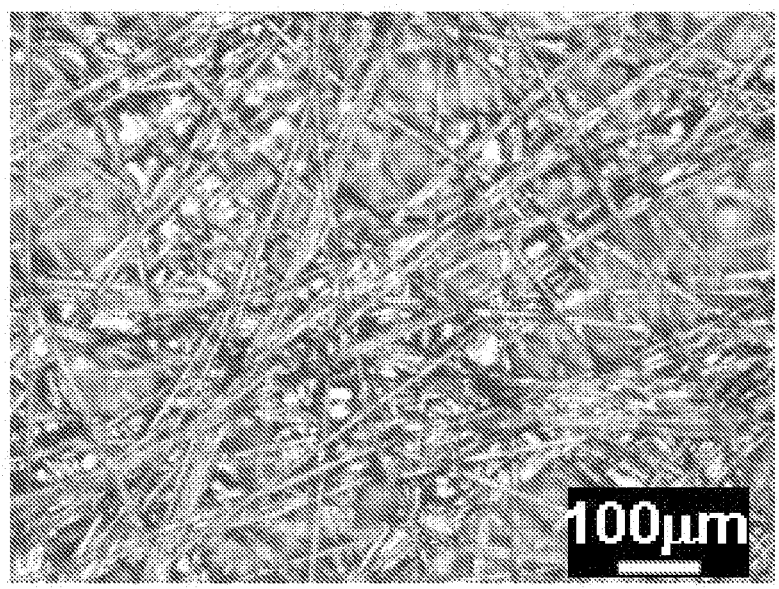
FIG. 8 is a photomicrograph showing the surface of carbon fiber paper untreated by metallic electrodeposition.
Figure 9:
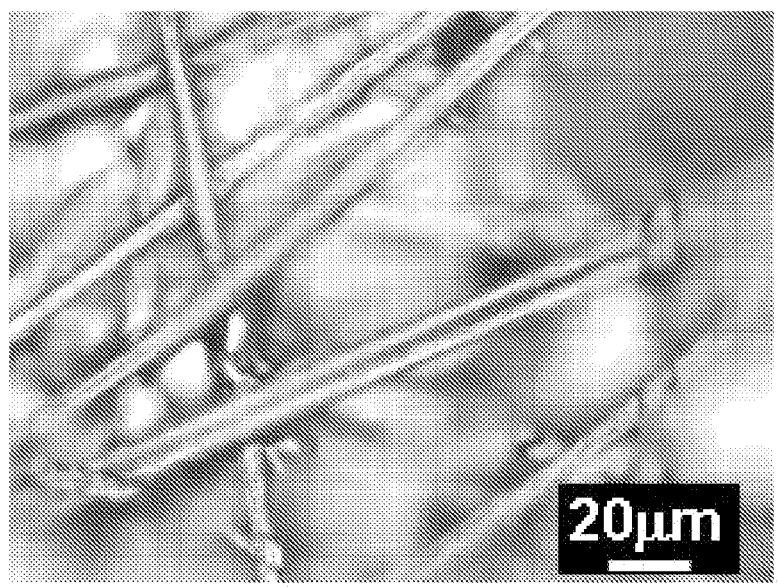
FIG. 9 is a photomicrograph showing a closeup of the fibers of carbon fiber paper untreated by metallic electrodeposition.

In a further embodiment, a porous, electrically conductive material forms a substrate for the cathode 16a. In one embodiment, the substrate comprises carbon fiber paper (CFP). Good results have been obtained with CFP TGP-H-120 Toray (Fuel Cell Earth, LLC, Stoneham, Mass.). FIG. 8 is a photomicrograph of a sample of CFP showing the fiber pattern and FIG. 9 shows the same CFP at a higher magnification, as indicated. The nominal diameter of the fibers is about 7.5 microns (μm) to about 10 μm and their length is in the hundreds of μm. The nominal thickness is about 370 μm and the porosity ($\Phi$) about 78. It will be appreciated by those skilled in the relevant art that these dimensions and properties are specific to Toray CFP, and that other like materials with varying configurations will also be suitable. CFP provides a flow-through structure whereby $CO_2$ gas 30 in the gaseous feed stream 32 (see, e.g., FIG. 7) to the electrochemical reactor 350 (FIG. 7) flows through the thickness of the porous cathode 16a to the catholyte 25 where $CO_2$ is converted to formate/formic acid. Such a porous material may be classified as three-dimensional (3D). That is, in addition to a to length and width that define a two-dimensional superficial geometric area, the material also has more than nominal thickness. Thus, a porous 3D cathode upon which a cathodic catalyst is deposited beyond the superficial geometric area, will be capable of catalytically converting reactants to products in the interior of the cathode, interior to the superficial geometric area. For example, the CFP cathode discussed above herein, with a nominal thickness of about 370 μm, has shown deposits at a depth of about 25 μm to about 35 μm from each side into the interior of the superficial geometric area when fabricated as discussed herein below.

Deposition Method One

Figure 10:
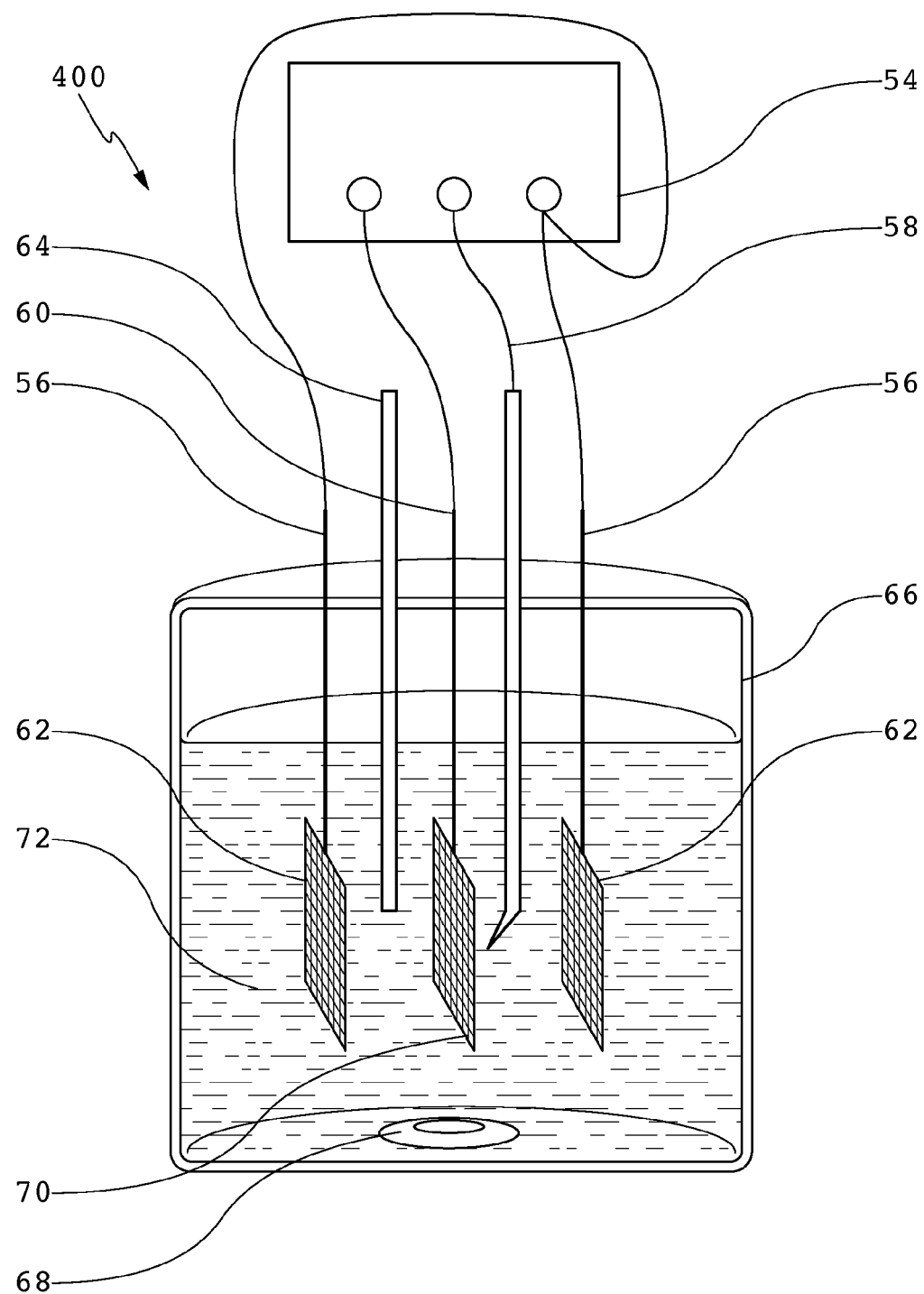
FIG. 10 is a schematic of an electrochemical reactor apparatus for metallic deposition.
Figure 11:
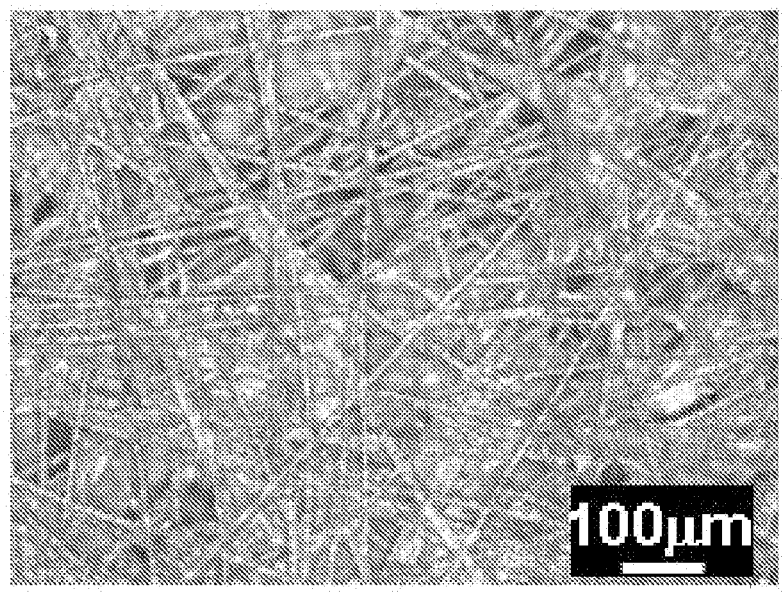
FIG. 11 is a photomicrograph showing the surface of carbon fiber paper treated by electrodeposition of Sn by a first method using the apparatus shown in FIG. 10.
Figure 12:
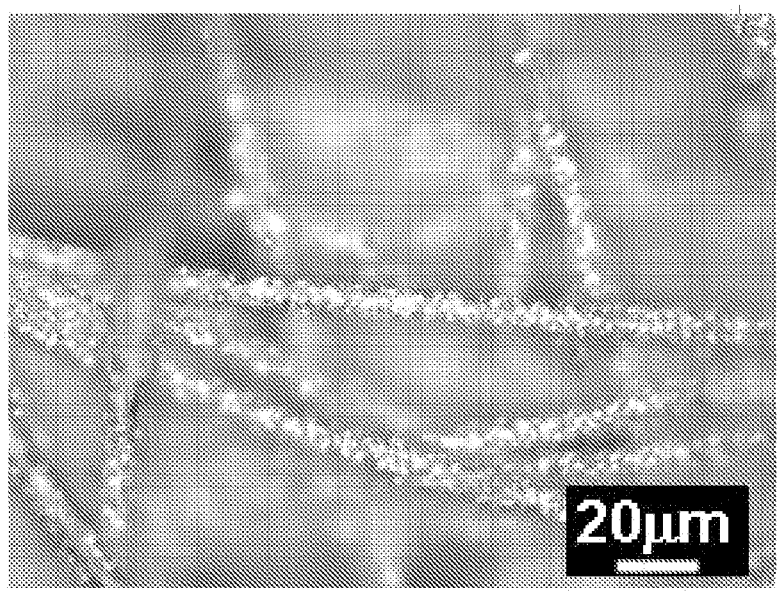
FIG. 12 is a photomicrograph showing a closeup of the fibers of carbon fiber paper treated by electrodeposition of Sn by the first method using the apparatus shown in FIG. 11.

In a further embodiment, using the deposition apparatus 400 illustrated in FIG. 10, and the deposition process described herein below, pure Sn was deposited onto CFP in a uniform coating as shown in FIGS. 11 and 12. As above, with photomicrographs of the plain CFP, FIG. 11 shows the fiber pattern generally with the Sn deposited thereon. FIG. 12 shows the same deposition, but at a higher magnification, as indicated.

Turning now to FIG. 10, the deposition apparatus 400 includes a fluid bath jacket 66 for temperature control and contains a deposition bath 72. A magnetic stirring bar 68 mixes the bath 70 and a temperature probe 64 is inserted into the bath 72. The apparatus 400 includes a reference electrode 58 and two counter electrodes 56 of Pt-coated Nb mesh, which, to avoid edge effects, are sized slightly larger than a cathode substrate material 70 attached to a working electrode 60, the onto which the Sn is be deposited. The counter electrodes 56 are positioned in parallel to the working electrode 60. A potentiostat 54 supplies constant current density between the working electrode 60 and the counter electrodes 56, where the working electrode 60 is negatively charged during the deposition. For Toray CFP, a current density of about 2.5 $mA/cm^2$ was used based upon the superficial geometric area. For example, a rectangular substrate material 70 having a length of about 3 cm and a width of about 3.3 cm would have a superficial geometric area of about 10 $cm^2$. A circular substrate material 70 would have a diameter of 2.54 cm for a 5 $cm^2$ superficial geometric area. The temperature of the bath 72 was maintained between about 50 deg. C. and about 55 deg. C. Time of deposition ranged from 30 min. to about 1.5 hr.

In a further embodiment, the deposition bath 72 was as follows:

| | | | |
|---|---|---|---|
| stannous Chloride (dihydrate) | $SnCl_2 \cdot 2H_2O$ | 0.19 mol/L | (0.08-0.20 mol/L) |
| tetrapotassium Pyrophosphate | $K_4P_2O_7$ | 0.56 mol/L | (0.40-0.60 mol/L) |
| glycine | $C_2H_5NO_2$ | 0.17 mol/L | (0.10-0.20 mol/L) |
| ammonium hydroxide | $NH_4OH$ | 0.04 mol/L | |
| pH | | 8-9 | |

The parenthetical values above are ranges for the indicated compounds.

The entire process included wetting the cathode substrate material 70 by immersion in ethanol for about 30 sec. to improve wettability, electrodepositing Sn onto the substrate 70 as described herein above, removing the substrate 70 from the bath 72 and immersing the substrate 70 into a large quantity of distilled water, immersing the substrate 70 into deionized (DI) water, cleaning in an ultrasonic cleaner for about three min., rinsing with DI water and slowly blow drying with (nitrogen ($N_2$) gas. (See FIGS. 11 and 12.)

CFP-Sn Cathodic Catalyst Cathode Tests-Deposition Method One

Figure 16:
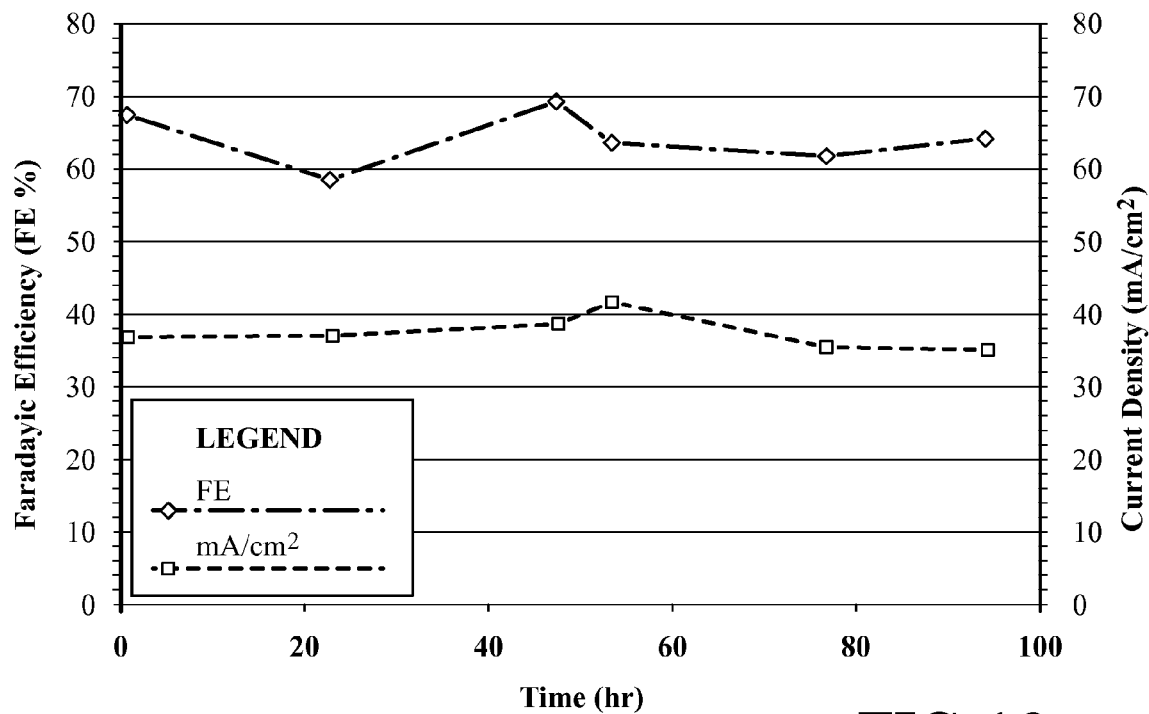
FIG. 16 is a graph of FE % and Current Density (mA/cm$^2$) versus Time (hr) for a carbon fiber paper treated by electrodeposition of Sn by the first method using the apparatus shown in FIG. 10.

Turning now to FIG. 16, a cathode prepared as above under Method One was tested in a three-compartment reactor as shown in FIG. 7. The cathode comprised a CFP substrate and Sn deposited as described herein above under Method One and had a superficial geometric area of 10 $cm^2$. $CO_2$ gas flowrates were between 226 ml/min and 550 ml/min. The catholyte was $CO_2$ pre-saturated 2M KCl, with flowrates in the range of between 2.25 ml/min and 2.5 ml/min. The anolyte was 1M KOH with flowrates of between 40 ml/min and 80 ml/min. Pressures inside the catholyte and anolyte compartments were similar, with catholyte compartment values in the range of between 0.295 psig and 0.395 psig, and for the anolyte compartment, between 0.28 psig and 0.528 psig. The pressure in the gas compartment was between 0.45 psig and 2.01 psig. The pressure in the gas compartment was always higher that the catholyte compartment pressure, the difference being between about 0.055 psi and about 1.646 psi. Anodes of both Ni plate and Ti plate/$Ta_2O_5$/$IrO_2$ (discussed herein below) were used. $V_{CELL}$ was 3 V. FIG. 16 illustrates performance over time of the Sn-deposited CFP cathode in the three-compartment flow cell shown in FIG. 7. As shown in FIG. 16, both the FE and Current Density remained high and relatively constant over the four-day experiment.

Deposition Method Two

In a further embodiment, Sn was deposited onto CFP using the deposition apparatus 400 shown in FIG. 10 and as described herein above. Further, the operating parameters were the same, except the temperature was between 55 and 65 deg. C., and the time of deposition was between one and two hours. The deposition bath may comprise a tin salt, at least one complexing agent, an anti-oxidant, and a non-ionic surfactant. Specifically, the deposition bath comprised:

| | | |
|---|---|---|
| stannous Chloride (dihydrate) | $SnCl_2 \cdot 2H_2O$ | 0.2 mol/L |
| tetrapotassium Pyrophosphate | $K_4P_2O_7$ | 0.5 mol/L |
| glycine | $C_2H_5NO_2$ | 0.2 mol/L |
| L-ascorbic acid | $C_6H_8O_6$ | 10 g/L |
| polyoxyethylene (12) nonylphenyl ether | | 0.1 g/L |
| pH | | 4.5 |

Figure 13:
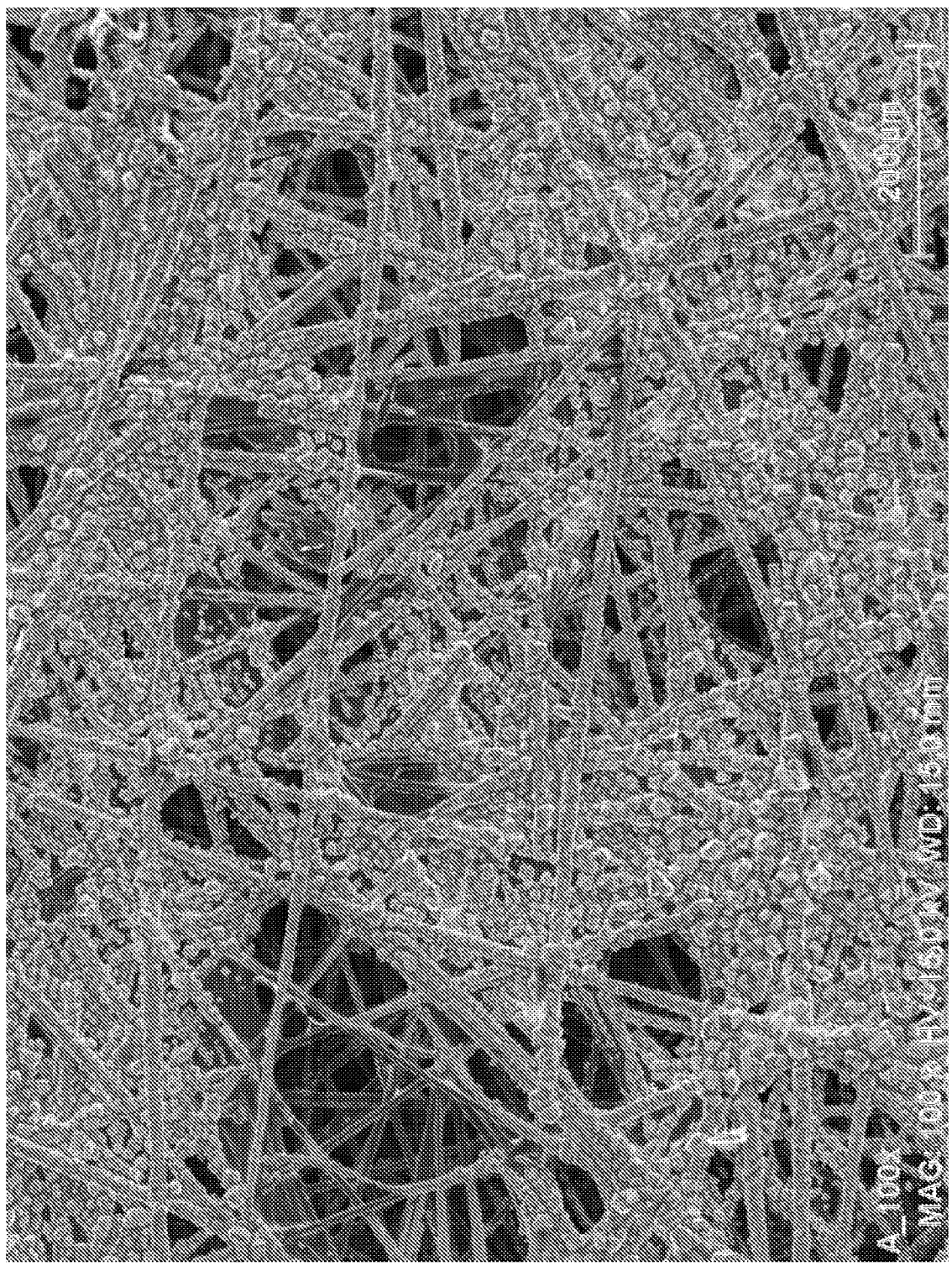
FIG. 13 is a photomicrograph showing the surface of carbon fiber paper treated by electrodeposition of Sn by a second method using the apparatus shown in FIG. 10.
Figure 14:
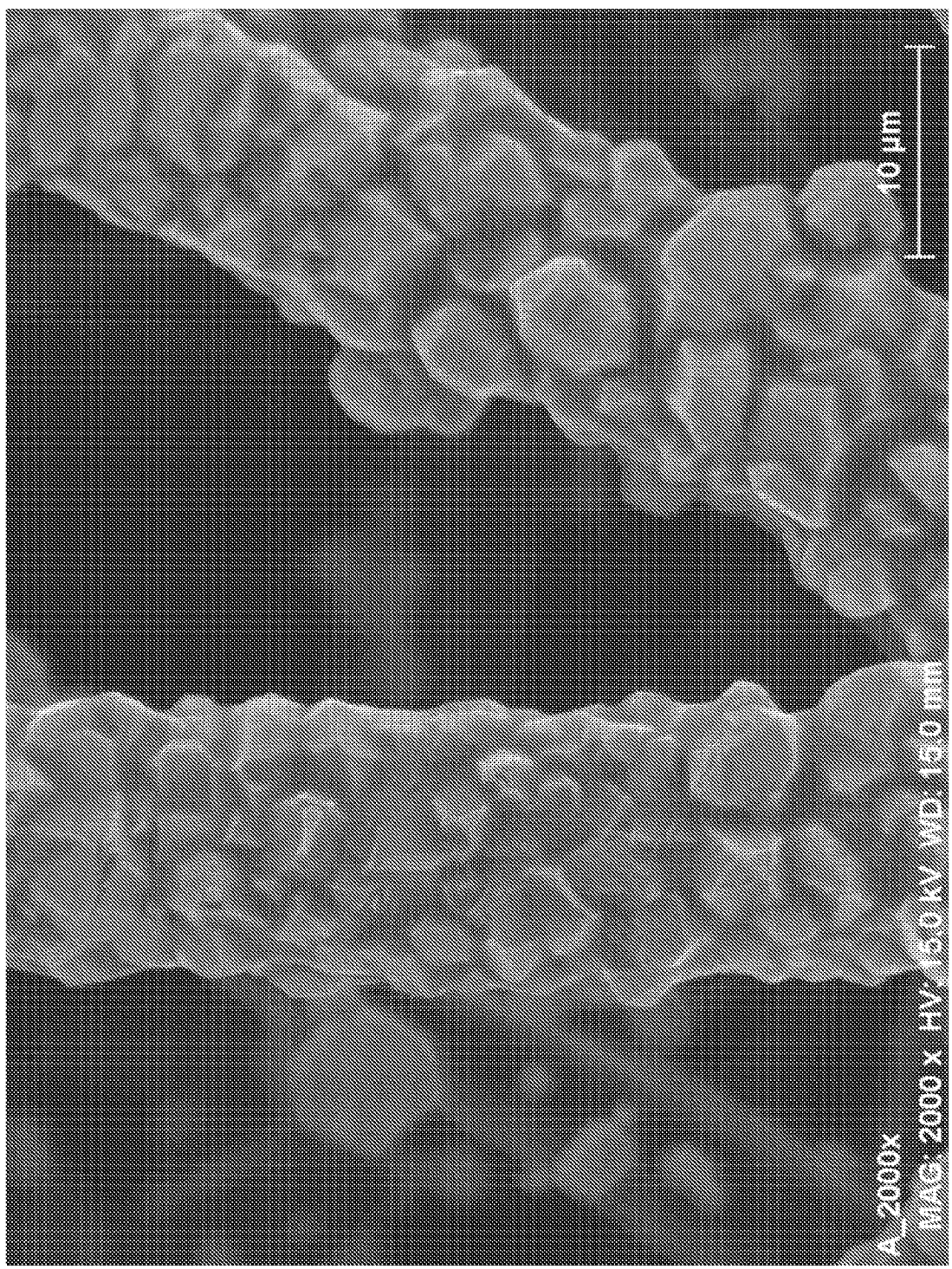
FIG. 14 is a photomicrograph showing a closeup of the fibers of carbon fiber paper treated by electrodeposition of Sn by the second method using the apparatus shown in FIG. 10.
Figure 15:
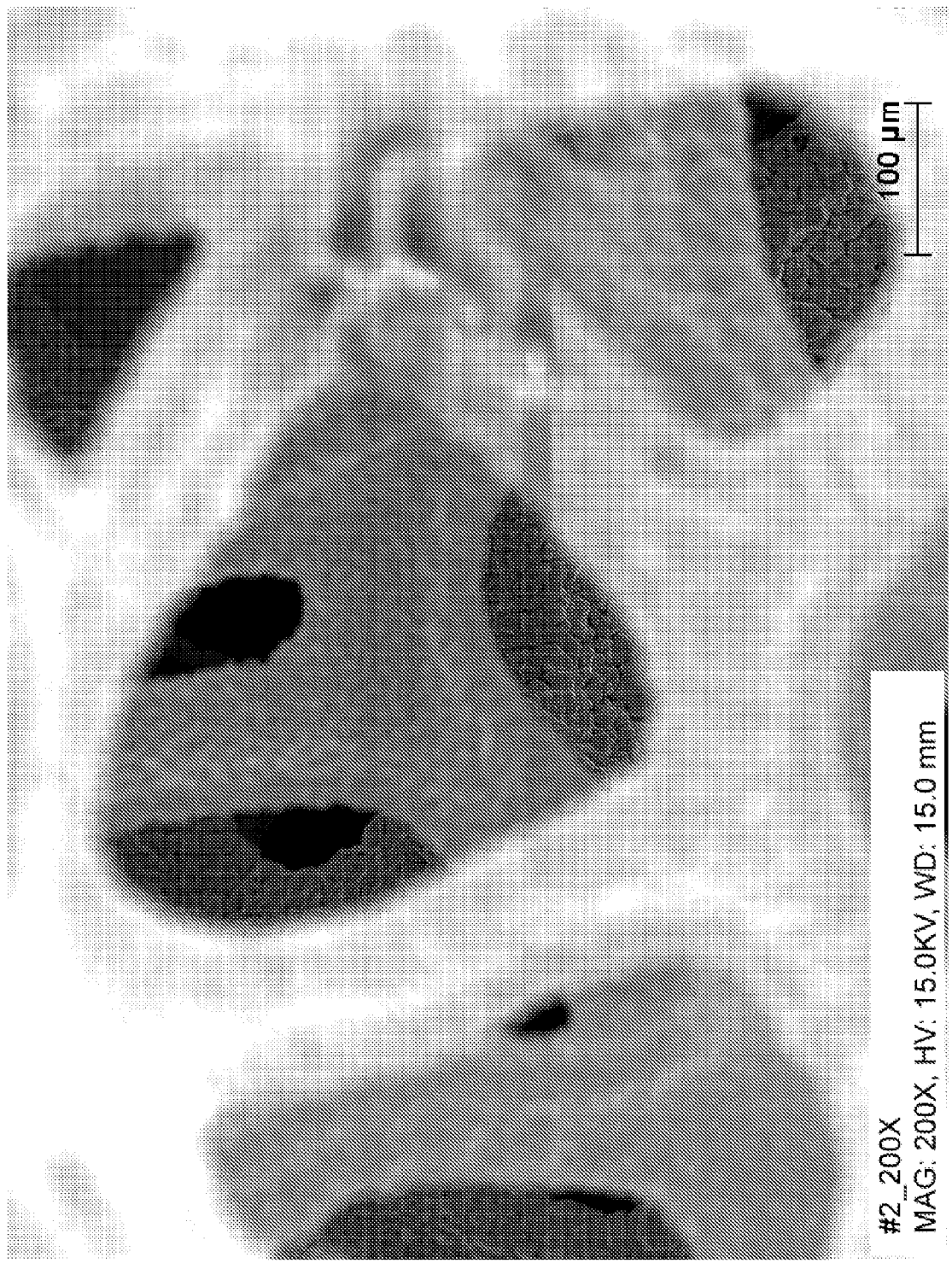
FIG. 15 is a photomicrograph showing a closeup of nickel (Ni) foam treated by electrodeposition of Sn by the second method using the apparatus shown in FIG. 10 and focused on the interior of the foam.

The results are shown in FIGS. 13, 14, and 15 which show a dense, uniform coating. FIG. 13 shows the fiber pattern generally with the Sn deposited thereon. FIG. 14 shows the same deposition, but at a higher magnification as indicated showing the individual Sn grains. Finally, FIG. 15 shows Sn deposited onto a Ni foam. The Ni foam used was Incofoam® (Novamet Specialty Products, Wyckoff, N.J.). The photomicrograph was focused on the interior of the foam, so the grains in the background are more defined.

CFP-Sn Cathodic Catalyst Cathode Tests-Deposition Method Two

Figure 17:
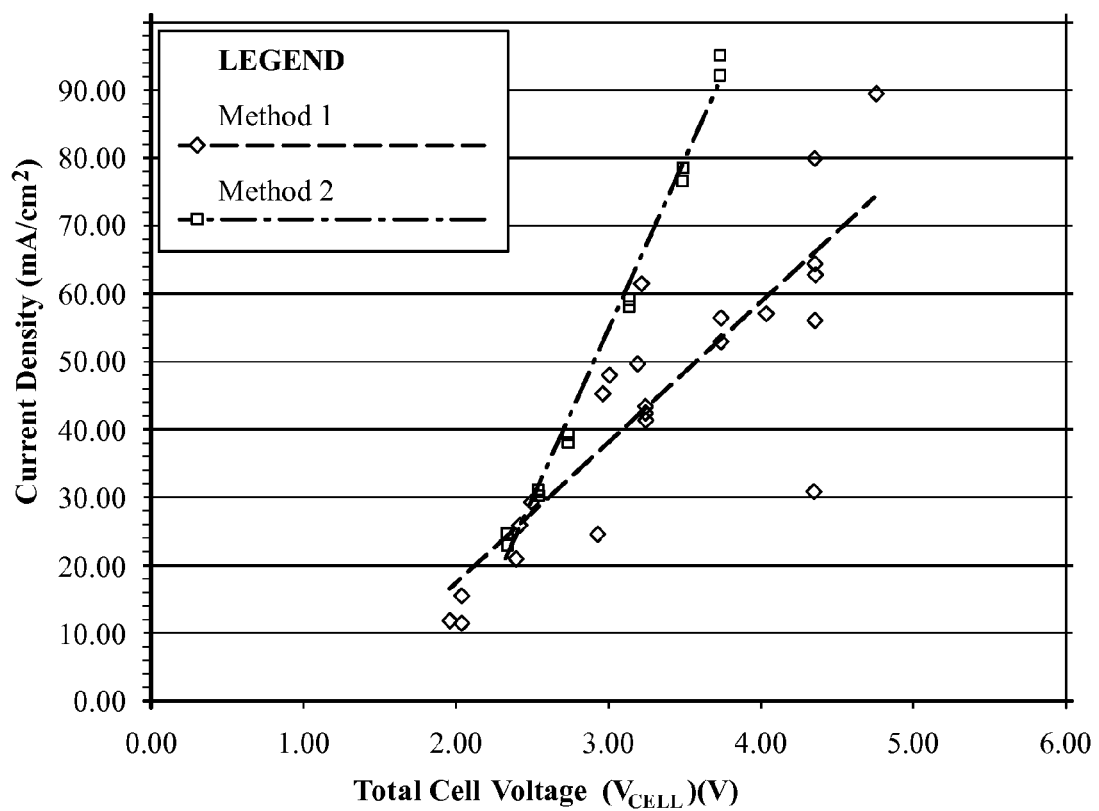
FIG. 17 is a graph of Current Density versus cell potential for Sn deposited onto carbon fiber paper by the first method and the second method using the apparatus shown in FIG. 10.

A cathode prepared as above under Method Two was also tested in a three-compartment reactor as shown in FIG. 7. The cathode comprised a CFP substrate and Sn deposited as described herein above under Method Two and had a superficial geometric area of 10 cm². $CO_2$ gas flowrate was 70 ml/min. The catholyte was $CO_2$ pre-saturated 2M KCl, with flowrates between 7 and 8 ml/min and the anolyte was 1M KOH. The anode was Pt-coated Nb mesh. $V_{CELL}$ was between 2.6 V and 4.0 V. The $CO_2$ gas and catholyte flowrates were controlled by a gas/liquid (G/L) ratio. As shown in FIG. 17, Method Two appears to provide superior results compared with Method One. At the same $V_{CELL}$ of 3.75 V, for example, the cathode prepared by Method One achieved a current density of 45 mA/cm², while the cathode prepared by Method Two achieved a current density of 75 mA/cm². While not wishing to be bound by any particular theory, it is believed that the increased coverage of Sn, and a more uniform deposit of finer grains (see, FIGS. 11 and 12 versus 13 and 14), contributed to the observed improvement.

Figure 18:
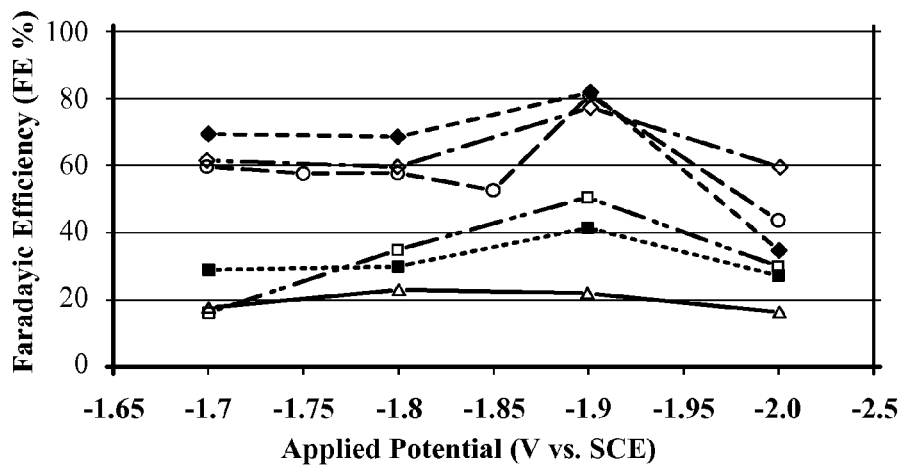
FIG. 18 is a graph of FE % versus Applied Potential (V, v. SCE) for tests performed with various catholytes.

In a further embodiment, a process is provided which includes improved catholyte compositions for ECRC to formate. FIG. 18 illustrates the short-time (2 hours) performance of a pure Sn coil electrode in selected catholytes in a vertical half-cell as shown in FIG. 3. Pure CO2 gas was continuously purged through a 40 cm long, 1 mm diameter coil cathode at 75 ml/min. The anode was Pt wire which was immersed in an anolyte of 1M NaOH.

As shown in FIG. 18, high FE was obtained using a pure Sn cathode in 2M KCl at a pH of 5.5, 2M NaCl at a pH of 5.3, and 0.5M $Na_2SO_4$ at a pH of 5.5. Other catholytes tested include 0.5M $KHCO_3$ at a pH of 7.5, 2M KCl at a pH of 2.5, and $K_2SO_4$ at a pH of 6.5

Figure 19:
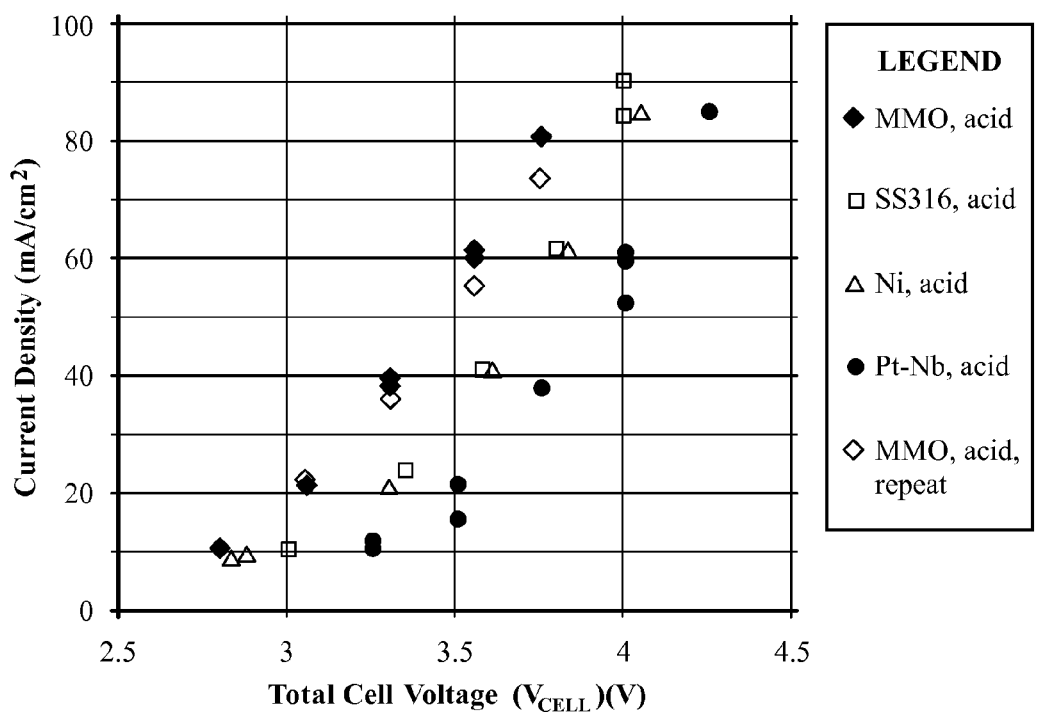
FIG. 19 is a graph of Current Density versus $V_{CELL}$ for various anodes in acidic anolyte.

In a further embodiment, a process is provided which includes an ECRC process comprising introducing an anolyte into an anolyte compartment, the anolyte compartment containing a metal oxide catalyst. Particularly, the anolyte is acidic and the anode comprises a mixed metal oxide catalyst. FIG. 19 shows current density (mA/cm²) for a mixed metal oxide anode in an acidic anolyte. The apparatus shown in FIG. 7 was used to develop the data in FIG. 19. The anolyte used was 0.5M $H_2SO_4$ at a flowrate of 45 ml/min. The catholyte was 2M KCl pre-saturated with $CO_2$ before introduction into the reactor at a flowrate of between 5 and 10 ml/min. The CO2 flowrate was maintained at between 69 and 84 ml/min. The cathode used for all of the experiments was Sn deposited onto CFP as described herein above under Deposition Method One. $V_{CELL}$ applied between the anode and the cathode was varied between 3.25 V and 4.25 V and the current densities measured. Catholyte samples were collected periodically and evaluated for the concentration of formic acid. For this analysis, the pH of the catholyte samples were first increased to 7 from the original catholyte values of between 2 and 3 using NaOH in order to convert all formic acid to formate ions. An Ion Chromatograph was used to measure the concentration of formate ions. Unlike the case where alkaline solutions (e.g., KOH and NaOH) are used as an anolyte, in the acidic anolyte case, H ions are formed and transported across the cation exchange membrane. This allows for the direct formation of formic acid on the cathode side rather than formate ions as in the alkaline anolyte case. This leads to a decrease in the cost of chemical consumption in converting formate ions to formic acid in later post processing if formic acid is the desired product. Also, in the alkaline anolyte case, the hydroxide species ($4OH^- \rightarrow O_2+2H_2O+4e^-$) are consumed and need to be replaced. This adds the cost of alkaline hydroxides during operation. In the case of acidic anolytes, only water is consumed from the acidic electrolyte, which can be recycled after addition of water, thus reducing the chemical operating expenditures.

Figure 20:
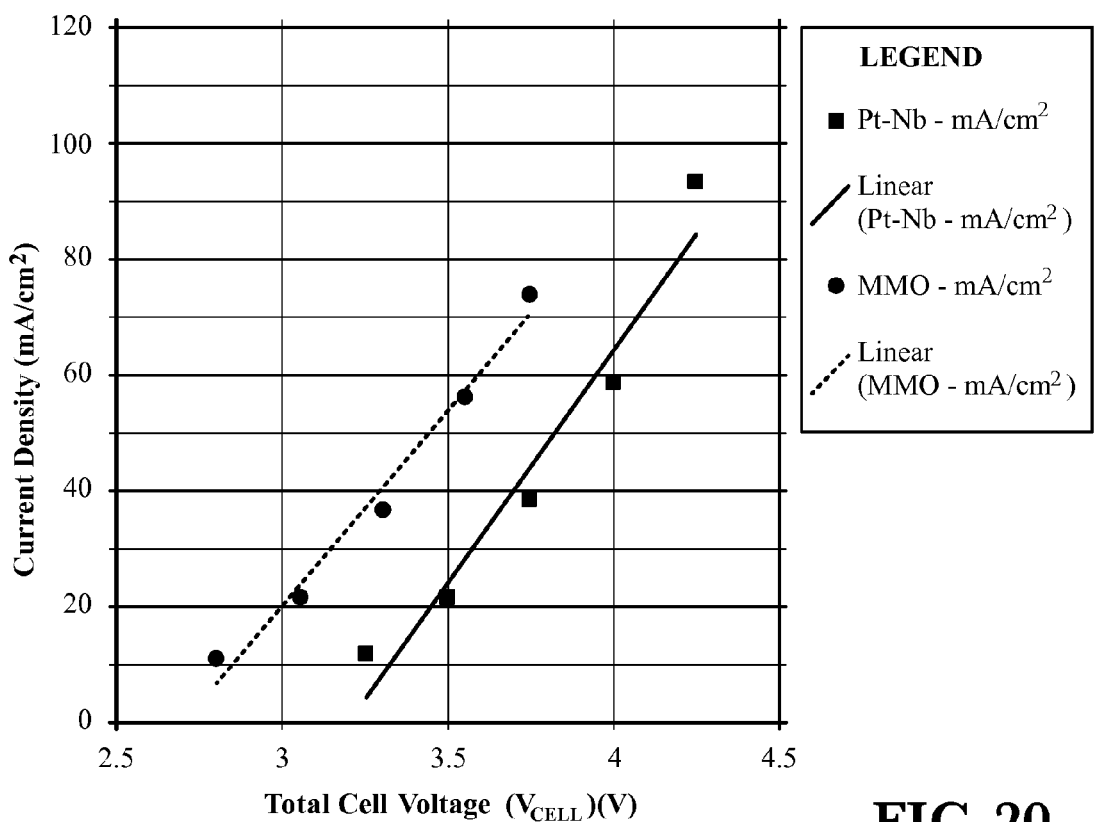
FIG. 20 is a graph of Current Density versus $V_{CELL}$ for a mixed metal oxide (Ti/Ta$_2$O$_5$/IRO$_2$) anode and a platinum-niobium (Pt—Nb) mesh anode in acidic anolyte.

Turning now to FIG. 19, current density (mA/cm²) is plotted against total cell voltage ($V_{CELL}$) for several anodes in an acidic environment as discussed herein above. Mixed metal oxide (MMO) is an electrode with a Ti plate substrate, a $Ta_2O_5$ layer deposited upon the substrate, and an $IRO_2$ layer deposited upon the $Ta_2O_5$ layer (Ti/$Ta_2O_5$/$IRO_2$). The material was acquired from NMT Electrodes Pty Ltd, Ashwood, ZA. Pt-coated Nb mesh is an electrode acquired from Anomet Products, Shrewsbury, Mass. The Ni and 316 stainless steel (SS316) were flat metal plates. Both the Ni and SS316 anodes exhibited pitting corrosion and dissolution during ECRC. As shown in FIG. 20, MMO exhibited improved performance over Pt—Nb mesh and reduced $V_{CELL}$ at constant current density.

Figure 21:
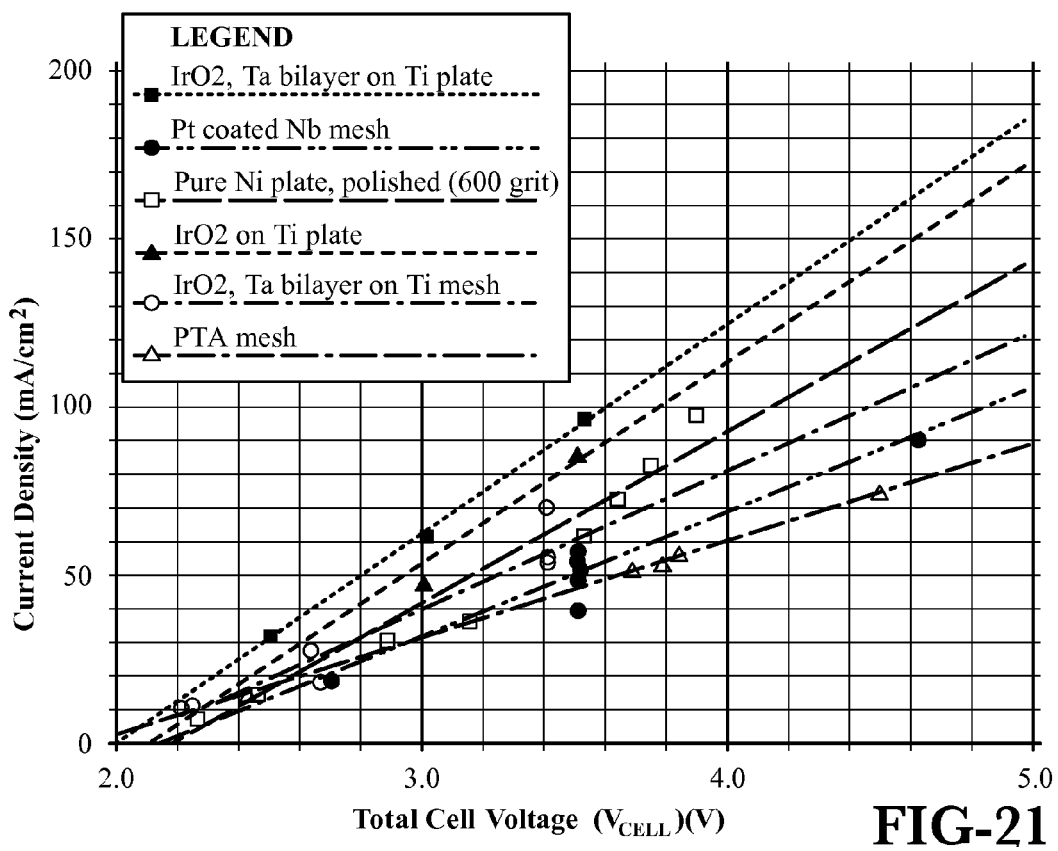
FIG. 21 is a graph of Current Density versus $V_{CELL}$ for various anodes in the three-compartment reactor shown in FIG. 7.

Turning now to FIG. 21, Current Density versus $V_{CELL}$ is shown for various mixed metal oxides and several other anode materials. The apparatus used for these tests is the three-compartment reactor shown in FIG. 7 under continuous operation. The indicated PTA mesh is an OPTIMA™ PTA Series platinum-plated, clad, and thermally deposited anode. The substrate is titanium. (Siemens AS, Water Technologies, Warrendale, Pa.) The $IRO_2$ on Ti plate was also acquired from NMT Electrodes Pty Ltd. The $IRO_2$, $Ta_2O_5$ bilayer on Ti plate was also acquired from NMT.

Figure 22:
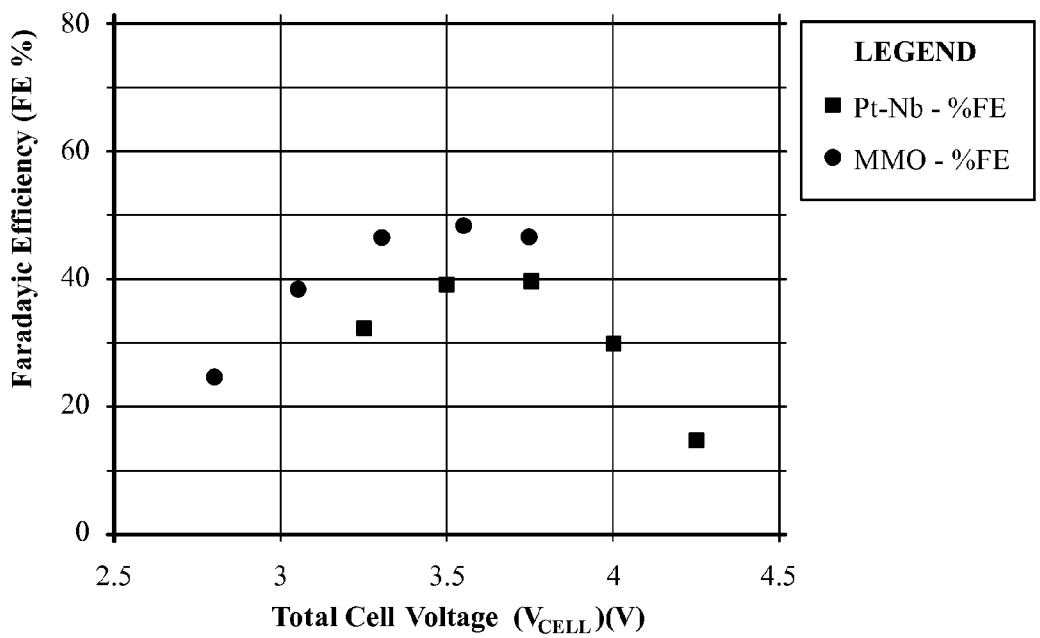
FIG. 22 is a graph of FE % versus $V_{CELL}$ for a Ti/Ta$_2$O$_5$/IrO$_2$ anode and a Pt—Nb anode in acidic anolyte.

Turning now to FIG. 22, it was surprisingly found that the selectivity (Faradaic Efficiency) of $Ti/Ta_2O_5/IrO_2$ of ECRC to formate is higher in an acidic anolyte than Pt—Nb, especially in the $V_{CELL}$ range of 3.30 V to 3.75 V, even though the same $O_2$ evolution reaction is taking place at the anode for both. While not wishing to be bound by any particular theory, it is believed that corrosion or dissolution of unsuitable anode materials, such as Pt, Ni, and iron (Fe) (from stainless steel), to their respective positive ions could occur in acidic anolyte solutions at high applied anodic potentials. These ions can then electrodeposit and coat the surface of the cathode catalyst, thereby reducing the Sn and Sn alloy catalyst area, thus reducing the rate of generation of formate salts/formic acid and hence lowering FE, as Ni, Fe, and Pt do not act a good electrochemical catalysts for formate generation.

In a further embodiment, momentary pulsed polarization restores FE that has degraded over time. High FE at high current densities at the cathode over extended times is desirable for ECRC. Under such conditions, at long runtimes black deposits can form on metal electrodes, including pure Sn. For example, with the pure Sn and Sn-alloy coil cathodes discussed herein above, in runtimes up to 20 hours in a half-cell, no deposits were found. However, black deposits with differing amounts (spots or fully covered coating) were generally found on electrodes of pure Sn and Sn-based alloys after more than 20 hours at a current density of about 10 $mA/cm^2$. Energy-dispersive X-ray (EDX) in scanning electron microscopy and Raman microscopy analysis of the deposits indicate they are likely graphite. The partial or full coverage of graphite on the cathode surface can be the cause of FE decrease because graphite is not a good catalyst for ECRC to formate. While not wishing to be bound by any particular theory, it is believed the carbon formation is the result of further reduction of formate on the surface of the catalysts if the formate product stays in contact with the catalyst for too long.

Figure 23:
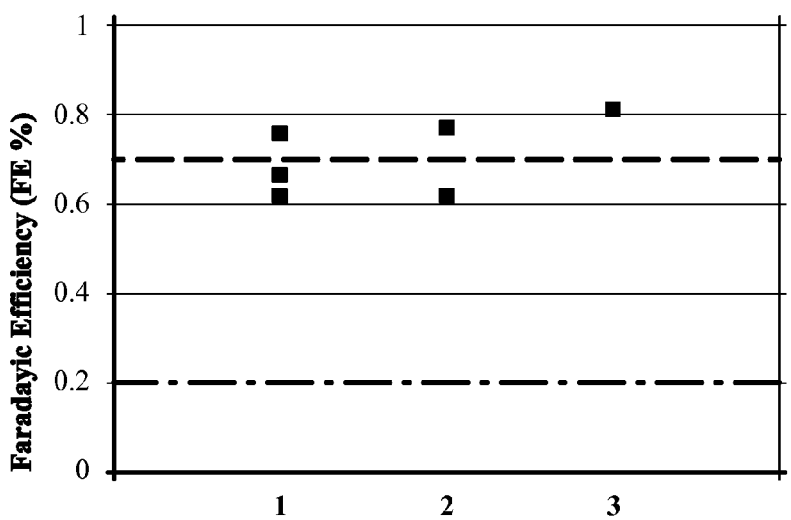
FIG. 23 is a graph of FE % for a study of several polarization pulse combinations.
Figure 23:
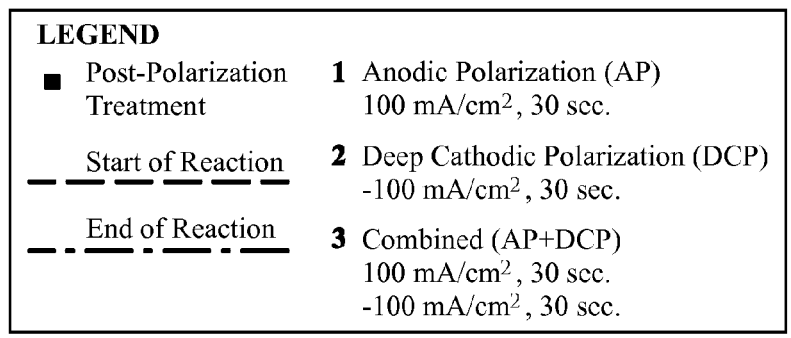

Different polarization treatment methods, including deep cathodic polarization (DCP), anodic polarization (AP), and combinations thereof, were utilized to remove the black deposits from long runtime pure Sn wire. Polarization was carried out in 2M KCl at different pHs (adjusted with HCl and/or $CO_2$). The visual results indicated that, after the polarization treatment, both AP, DCP, and combinations of AP and DCP can remove the black deposits that coated the cathode surface after a long time run of electrolysis. As shown in FIG. 23, AP was 100 $mA/cm^2$ for 30 seconds, DCP was $-100$ $mA/cm^2$ for 30 seconds, and the combined AP/DCP was for 100 $mA/cm^2$ and $-100$ $mA/cm^2$, respectively, each for 30 seconds. FIG. 23 illustrates the FE of used pure Sn electrode before and after these different polarization treatments. Tests were performed in the vertical half-cell testing apparatus shown in FIG. 3. The cathode was in coil form. The catholyte was 2M KCL and the anolyte was 1M NaOH. The top dashed line is the average high FE of the original pure Sn cathode before FE degradation due to the coverage of black deposits. The bottom dash-dot line is the average low FE of the original pure Sn cathode before polarization treatment. The square symbols identify the FEs of the polarization-treated Sn cathode, which were similar to the top dashed line, an indication that full recovery of FE is achieved by polarization treatments.

The cathodes used in the above experiments were relatively small compared with a large-scale commercial unit, where baseline current densities on the order of 100 $mA/cm^2$ to 500 $mA/cm^2$ would be found. In that case, AP pulses on the order of 500 $mA/cm^2$ and 5000 $mA/cm^2$, respectively, and that of DCP pukes would be on the order of $-500$ $mA/cm^2$ and $-5000$ $mA/cm^2$, respectively. Thus, the current density of AP pulses is a positive current density about ten times the current density effected by the impressed DC voltage across the anode and the cathode. Likewise, the current density of DCP pulses is a negative current density about ten times the current density effected by the impressed. DC voltage across the anode and the cathode. AP pulses and DCP pulses may also be applied sequentially.

The pulses are infrequent and of short duration, typically between about five and about 120 seconds every two to ten hours, or, generally, between about 0.3 percent and 1.7 percent of the interval between applications. While not wishing to be bound by any particular theory, it is believed that these polarization methods may dissolve small amounts of Sn for forming Sn-hydride, which is unstable. In the process, the black deposits are removed from the cathode.

Figure 24:
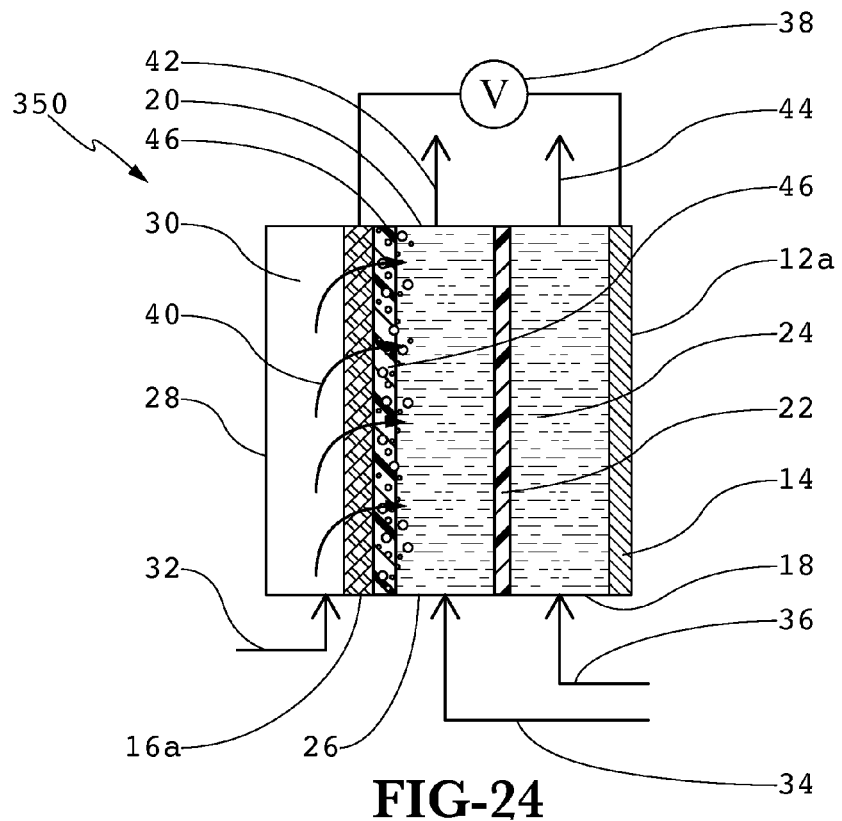
FIG. 24 is a schematic of the three-compartment electrochemical reactor shown in FIG. 7 with a porous, absorbent, nonconductive pad adjacent to the cathode.

FIG. 24 shows a three-compartment reactor 350, and is a modification of FIG. 7 as discussed herein above. Further included is a porous, absorbent, nonconductive pad 46, such as foam or felt, adjacent to the porous cathode 16a. The porous, absorbent, nonconductive pad 46 in contact with the porous cathode 16a prevents the formation of a gas layer near the porous cathode 16a which can break the continuity in the electrolyte. Good results have been obtained with plain-backed ⅛-inch-thick wool felt sheet (Item 8341K31, McMaster-Carr, Aurora, Ohio).

Figure 25:
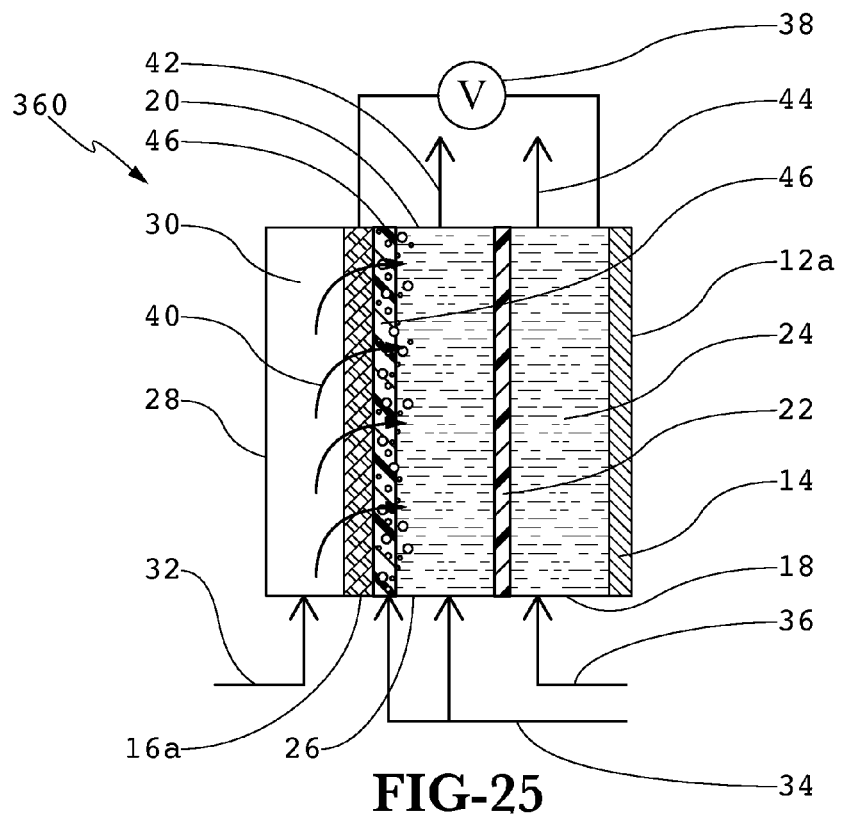
FIG. 25 is a schematic of the three-compartment electrochemical reactor shown in FIG. 25 with catholyte feed directly into the pad.

FIG. 25 shows a three-compartment reactor 360, and is a modification of FIG. 24, further including a catholyte feed 34 into the porous, absorbent, nonconductive pad 46. This enables intimate contact between the catholyte 25 and the membrane 22.

Figure 26:
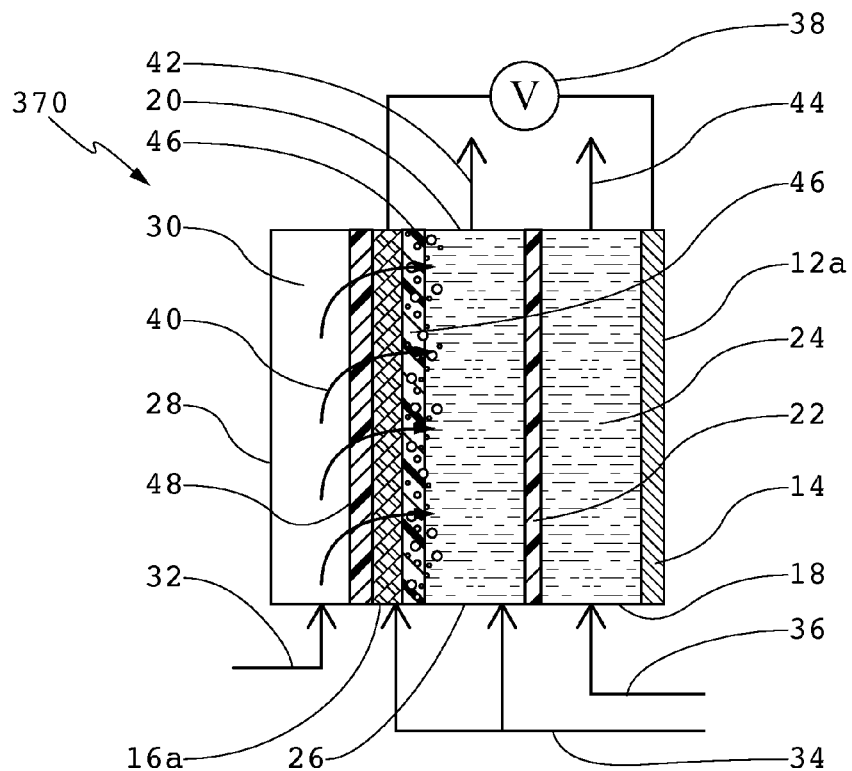
FIG. 26 is a schematic of the three-compartment electrochemical reactor shown in FIG. 26 with a diffuser adjacent to the cathode.

FIG. 26 shows a three-compartment reactor 370, is a modification of FIG. 25, further including a diffuser 48 adjacent the porous cathode 16a on the gas compartment side of the porous cathode 16a. Good results were obtained with a PTFE-coated porous material which facilitates the distribution of the $CO_2$ gas 30. In a further embodiment, the diffuser 48 is fabricated to allow not only $CO_2$ gas 30 traversing the thickness of the diffuser 48, but to allow $CO_2$ gas 30 to move laterally along the length or width of the diffuser 48 as it traverses the thickness of the diffuser 48.

Figure 27:
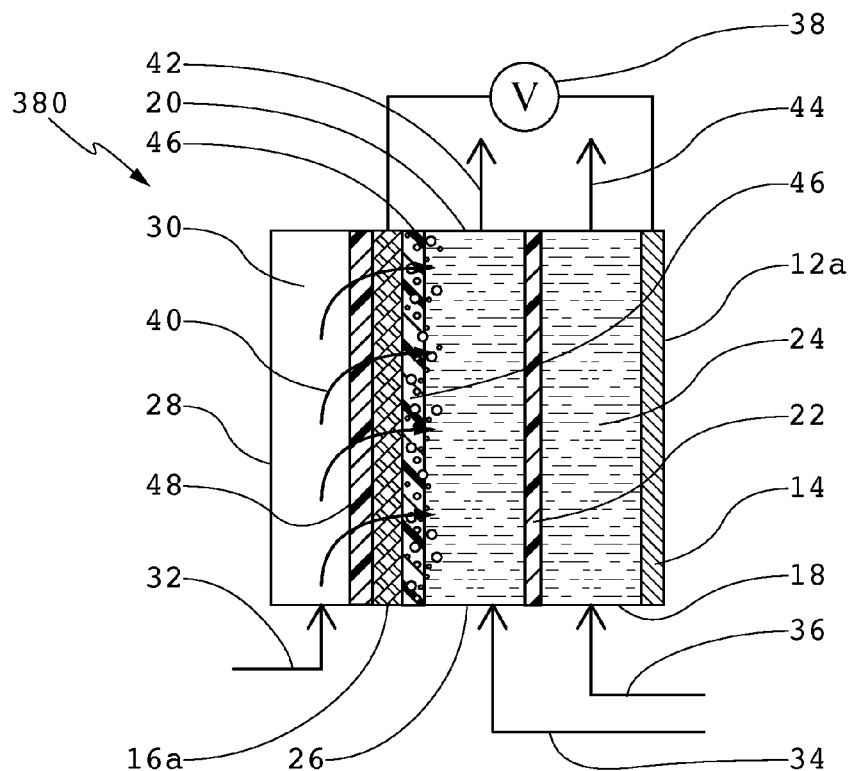
FIG. 27 is as schematic of the three-compartment electrochemical reactor shown in FIG. 25 with a diffuser adjacent to the cathode.

FIG. 27 shows a three-compartment reactor 380, and is a modification of FIG. 24, further including a diffuser 48 adjacent the cathode 16a on the gas compartment side of the cathode 16a. Good results were obtained with a PTFE-coated porous material which facilitates the distribution of the $CO_2$ gas 30. In a further embodiment, the diffuser 48 is fabricated to allow not only $CO_2$ gas 30 traversing the thickness of the diffuser 48, but to allow $CO_2$ gas 30 to move laterally along the length or width of the diffuser 48 as it traverses the thickness of the diffuser 48.

Figure 28:
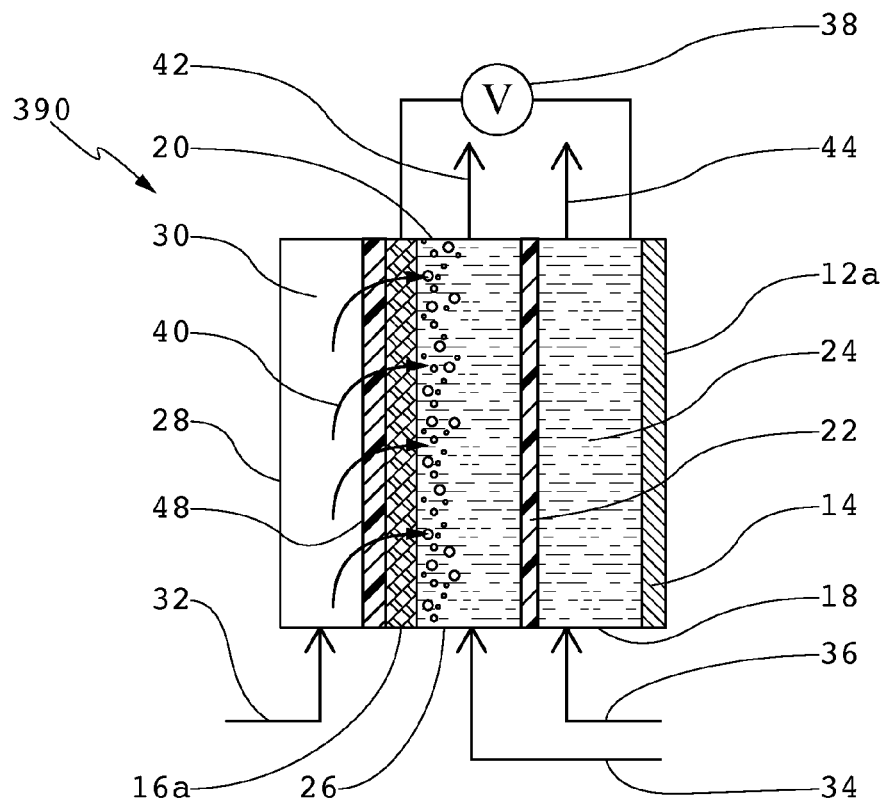
FIG. 28 is a schematic of the three-compartment electrochemical reactor shown in FIG. 7 with a diffuser adjacent to the cathode.

FIG. 28 shows a three-compartment reactor 390, and is a modification of FIG. 7, further including a diffuser 48 adjacent the cathode 16a on the gas compartment side of the cathode 16a. Good results were obtained with a PTFE-coated porous material which facilitates the distribution of the $CO_2$ gas 30. In a further embodiment, the diffuser 48 is fabricated to allow not only $CO_2$ gas 30 traversing the thickness of the diffuser 48, but to allow $CO_2$ gas 30 to move laterally along the length or width of the diffuser 48 as it traverses the thickness of the diffuser 48.

Figure 29:
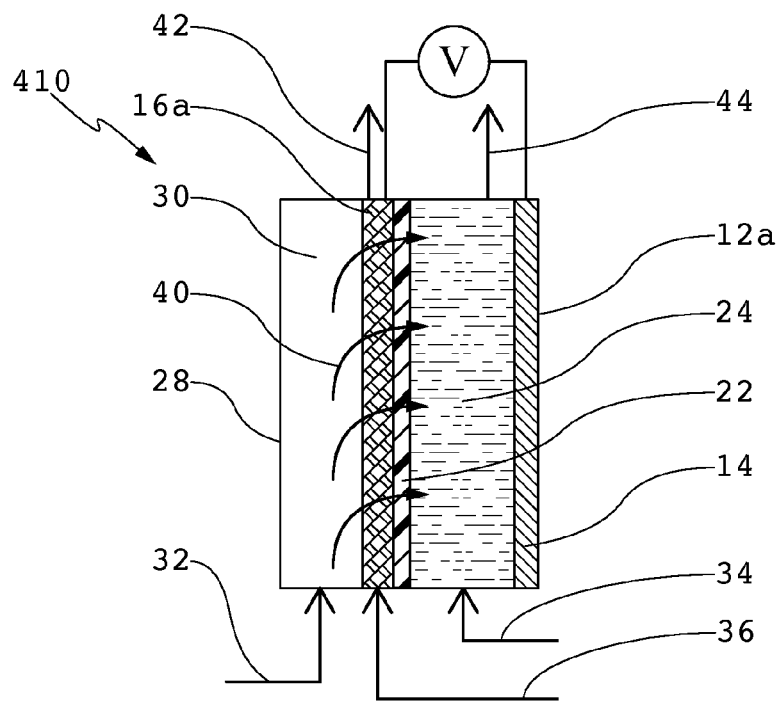
FIG. 29 is a schematic of the three-compartment electrochemical reactor shown in FIG. 7 with catholyte feed directly into the cathode.

Turning now to FIG. 29, a three-compartment electrochemical reactor 410 is shown in which a three-compartment container 12a encloses an anolyte compartment 18, and anode 14, and, during operation, anolyte 24 contained within the anolyte compartment 18; a membrane 22; a catholyte compartment 20, a porous cathode 16a, and, during operation, catholyte compartment mixture 26 contained within the catholyte compartment 20; and a gas compartment 28, the gas compartment 28 containing, during operation, $CO_2$ gas 30. The membrane 22 separates the anolyte compartment 18 and the catholyte compartment 20. The porous cathode 16a is adjacent the membrane 22 and virtually occupies the catholyte compartment 20 as shown. The gas compartment 28 is adjacent the catholyte compartment 20 and the porous cathode 16a. Also during operation, an anolyte feed 36 introduces anolyte 24 into the anolyte compartment 18, an anolyte withdrawal 44 removes anolyte 24 as well as other anode reaction products, a catholyte feed 34 introduces catholyte 25 into the catholyte compartment 20 and the porous cathode 16a, a catholyte compartment mixture withdrawal 42 removes catholyte compartment mixture 26, and a $CO_2$ gas feed 32 introduces $CO_2$ gas 30 into the gas compartment 28. During operation, the $CO_2$ gas 30 in the gas compartment 28, under a pressure differential with the porous cathode 16a, is distributed (indicated by arrows 40 and flows into the porous cathode 16a and into the catholyte 16 and catholyte mixture 26. The porous cathode 16a may comprise a suitable cathodic catalyst, for example, one based upon Sn or a Sn-based alloy as described herein. The porous cathode 16a may further comprise substrates and cathodic catalysts deposited as described herein.

Figure 30:
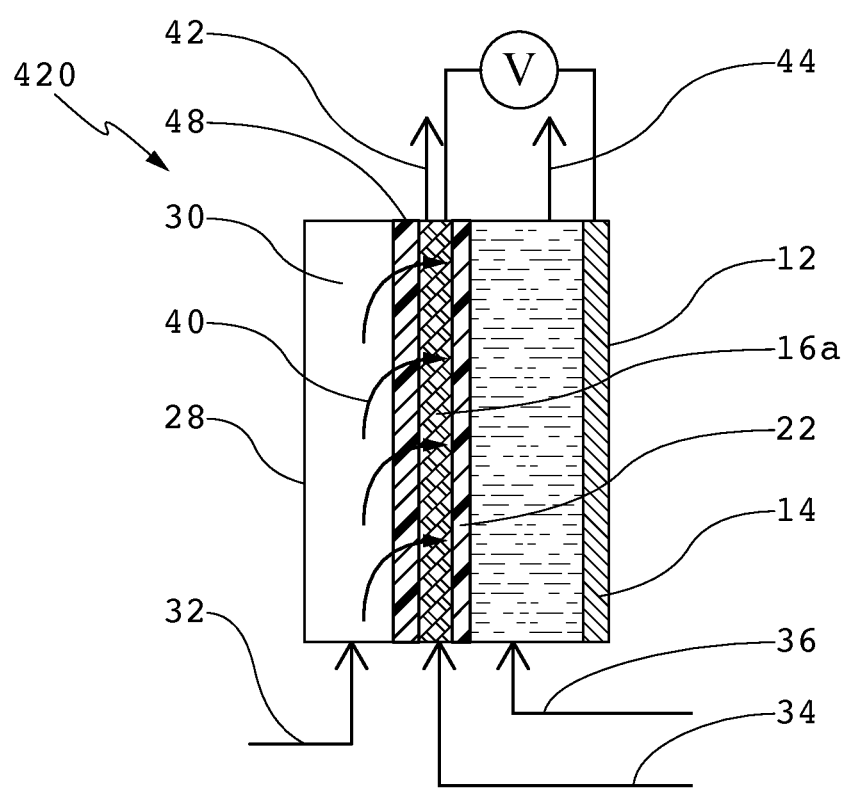
FIG. 30 is a schematic of the three-compartment electrochemical reactor shown in FIG. 29 with a diffuser adjacent to the cathode.

FIG. 30 shows a three-compartment reactor 420, and is a modification of FIG. 29, further including a diffuser 48 adjacent the cathode 16a on the gas compartment side of the cathode 16a. Good results were obtained with a PTFE-coated porous material which facilitates the distribution of the $CO_2$ gas 30. In a further embodiment, the diffuser 48 is fabricated to allow not only $CO_2$ gas 30 traversing the thickness of the diffuser 48, but to allow $CO_2$ gas 30 to move laterally along the length or width of the diffuser 48 as it traverses the thickness of the diffuser 48.

While certain preferred embodiments of the present invention have been disclosed in detail, it is to be understood that various modifications may be adopted without departing from the spirit of the invention or scope of the following claims.

We claim:

1. An apparatus for the electrochemical reduction of carbon dioxide to formate, comprising:
   a container;
   a membrane, the membrane positioned within the container, the membrane dividing the container into a catholyte compartment and an anolyte compartment;
   an anode, the anode comprising:
      a titanium substrate; and
      a metal oxide catalyst, the metal oxide catalyst comprising:
         tantalum oxide deposited onto the substrate; and
         iridium oxide deposited onto the tantalum oxide, the anode positioned at least partially within the anolyte compartment;
   a cathode-and-pad combination, the cathode-and-pad combination comprising:
      a porous cathode, the porous cathode comprising:
         a porous substrate; and
         a coating, the coating selected from the group consisting of:
            (I) tin; and
               zinc, the zinc comprising between about three weight percent and about six weight percent of the coating; and
            (II) tin, the tin deposited onto the substrate, the tin comprising tin deposits having a grain size of between 0.5 microns and five microns, the tin deposits substantially covering the catholyte compartment side surface of the substrate, the tin deposited by a process comprising:
               (a) immersing the porous substrate into a solution comprising:
                  stannous chloride dihydrate;
                  at least one complexing agent selected from the group consisting of:
                     (i) tetrapotassium pyrophosphate; and
                     (ii) glycine; and
                     (iii) combinations thereof; and
                  a non-ionic surfactant; and
               (b) during step (a):
                  (i) maintaining the solution at a temperature of between 45 and 70 deg. C; and
                  (ii) applying a cathodic current density of 1.5 to 2.5 $mA/cm^2$ for between 0.5 and two hours; and
      a porous, nonconductive pad, the pad positioned adjacent to the membrane side of the cathode, the cathode-and-pad combination and the membrane at least partially defining the catholyte compartment;
   a gas compartment, the gas compartment in fluid communication with the cathode; and
   a voltage source, the voltage source in electrical communication with the anode and with the cathode, the voltage source configured to impress a DC voltage across the anode and the cathode.

2. A process for reducing carbon dioxide, comprising:
   (a) introducing an anolyte into an anolyte compartment of an electrochemical reactor, the anolyte compartment at least partially containing an anode;
   (b) introducing a catholyte into a catholyte compartment of the electrochemical reactor, the catholyte compartment separated from the anolyte compartment by a membrane, the catholyte compartment further separated from a gas compartment by a cathode-and-pad combination, the cathode-and-pad combination comprising:
      a porous cathode; and
      a porous, nonconductive pad, the pad positioned adjacent to the membrane side of the cathode, the cathode-and-pad combination and the membrane at least partially defining the catholyte compartment;
   (c) introducing carbon dioxide gas into the gas compartment;
   (d) introducing carbon dioxide gas from the gas compartment into the cathode;
   (e) introducing the carbon dioxide gas from the cathode into the catholyte; and
   (f) impressing a DC voltage across the anode and the cathode.

3. The process of claim 2, wherein the catholyte comprises 2M potassium chloride.

4. The process of claim 2, wherein:
   the anolyte comprises a solution selected from the group consisting of:
      (i) 1M sodium hydroxide; and
      (ii) 0.5M sulfuric acid.

5. The process of claim 2, further including the step of:
   (a) introducing at least a portion of the catholyte into the porous, nonconductive pad.

6. The process of claim 2, the cathode comprising:
a porous substrate; and
a coating, the coating comprising:
    tin; and
    zinc, the zinc comprising between about three weight percent and about six weight percent of the coating, wherein the carbon dioxide is reduced to formate.

7. The process of claim 2, the cathode comprising:
a porous substrate; and
tin, the tin deposited onto the substrate, the tin comprising tin deposits having a grain size of between 0.5 microns and five microns.

8. The process of claim 2, the cathode manufactured by a process comprising the steps of:
    (a) immersing a porous substrate into a solution comprising:
        a tin salt;
        at least one complexing agent; and
        a non-ionic surfactant; and
    (b) during step (a):
        (i) maintaining the solution at a temperature of between 45 and 70 deg. C; and
        (ii) applying a cathodic current density of 1.5 to 2.5 mA/cm$^2$ for between 0.5 and two hours.

9. The process of claim 8, wherein:
the tin salt comprises stannous chloride dihydrate; and
the at least one complexing agent is selected from the group consisting of:
    (i) tetrapotassium pyrophosphate; and
    (ii) glycine; and
    (iii) combinations thereof.

10. The process of claim 2, the anode comprising:
a titanium substrate; and
a metal oxide catalyst, the metal oxide catalyst comprising:
    tantalum oxide deposited onto the substrate; and
    iridium oxide deposited onto the tantalum oxide, wherein the carbon dioxide is reduced to formate, wherein the carbon dioxide is reduced to formate.

11. The process of claim 10, the cathode selected from the group consisting of:
    (i) a manufacture, comprising:
        a porous substrate; and
        a coating, the coating comprising:
            tin; and
            zinc, the zinc comprising between about three weight percent and about six weight percent of the coating, wherein the carbon dioxide is reduced to formate;
    (ii) a manufacture, comprising:
        a substrate; and
        tin deposits, the tin deposits having a grain size of between 0.5 microns and five microns, the tin deposits substantially covering the catholyte compartment side surface of the substrate; and
    (iii) a manufacture, formed by a process comprising:
        (a) immersing a porous and electrically conductive substrate into a solution comprising:
            a tin salt;
            at least one complexing agent; and
            a non-ionic surfactant; and
        (b) during step (a):
            (I) maintaining the solution at a temperature of between 45 and 70 deg. C; and
            (II) applying a cathodic current density of 1.5 to 2.5 mA/cm$^2$ for between 0.5 and two hours.

12. The process of claim 2, the catholyte comprising an aqueous solution of about 0.1M to about 3M of a compound selected from the group consisting of:
    (i) potassium sulfate having a pH of about 6.5; and
    (ii) sodium sulfate having a pH of about 5.5.

13. An apparatus, comprising:
an anolyte compartment, the anolyte compartment at least partially defined by an anode and a membrane;
a catholyte compartment, the catholyte compartment at least partially defined by a cathode-and-pad combination, the cathode-and-pad combination comprising:
    a porous cathode; and
    a porous, nonconductive pad, the pad positioned adjacent to the membrane side of the cathode;
a catholyte feed in fluid communication with the catholyte compartment;
a gas compartment, the gas compartment in fluid communication with the cathode; and
a voltage source, the voltage source in electrical communication with the anode and with the cathode, the voltage source configured to impress a DC voltage across the anode and the cathode.

14. The apparatus of claim 13, the cathode comprising:
a porous substrate; and
a coating, the coating comprising:
    tin; and
    zinc, the zinc comprising between about three weight percent and about six weight percent of the coating.

15. The apparatus of claim 13, the cathode comprising:
a porous substrate; and
tin, the tin deposited onto the substrate, the tin comprising tin deposits having a grain size of between 0.5 microns and five microns, the tin deposits substantially covering the catholyte compartment side surface of the substrate.

16. The apparatus of claim 13, the cathode manufactured by a process comprising:
    (a) immersing a porous substrate into a solution comprising:
        a tin salt;
        at least one complexing agent; and
        a non-ionic surfactant; and
    (b) during step (a):
        (i) maintaining the solution at a temperature of between 45 and 70 deg. C; and
        (ii) applying a cathodic current density of 1.5 to 2.5 mA/cm$^2$ for between 0.5 and two hours.

17. The apparatus of claim 13, the anode comprising:
a titanium substrate; and
a metal oxide catalyst, the metal oxide catalyst comprising:
    tantalum oxide deposited onto the substrate; and
    iridium oxide deposited onto the tantalum oxide.

18. The apparatus of claim 17, the cathode comprising:
a porous substrate; and
a coating, the coating comprising:
    tin; and
    zinc, the zinc comprising between about three weight percent and about six weight percent of the coating.

19. The apparatus of claim 17, the cathode comprising:
a porous substrate; and
tin deposits, the tin deposits having a grain size of between 0.5 microns and five microns, the tin deposits substantially covering the catholyte compartment side surface of the substrate.

20. The apparatus of claim 17, the cathode formed by a process comprising:
    (a) immersing a porous and electrically conductive substrate into a solution comprising:
        a tin salt;
        at least one complexing agent; and
        a non-ionic surfactant;

(b) maintaining the solution at a temperature of between 45 and 70 deg. C; and
(c) applying a cathodic current density of 1.5 to 2.5 mA/cm² for between 0.5 and two hours.

21. The apparatus of claim 13, wherein the cathode-and-pad combination is spaced apart from the membrane.

* * * * *